United States Patent
Stevens et al.

(10) Patent No.: US 12,091,476 B2
(45) Date of Patent: Sep. 17, 2024

(54) ON-LINE ADJUSTMENT OF CATALYSTS BY TRIM AND OLEFIN POLYMERIZATION

(71) Applicant: ExxonMobil Chemical Patents Inc., Baytown, TX (US)

(72) Inventors: Kevin A. Stevens, Houston, TX (US); David F Sanders, Beaumont, TX (US); Matthew W. Holtcamp, Huffman, TX (US); Charles J. Harlan, Houston, TX (US); Xuan Ye, Houston, TX (US); Adriana S. Silva, Houston, TX (US); Matthew S. Bedoya, Humble, TX (US); Joshua P. Olson, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 212 days.

(21) Appl. No.: 17/279,736

(22) PCT Filed: Oct. 30, 2019

(86) PCT No.: PCT/US2019/058901
§ 371 (c)(1),
(2) Date: Mar. 25, 2021

(87) PCT Pub. No.: WO2020/092597
PCT Pub. Date: May 7, 2020

(65) Prior Publication Data
US 2022/0033537 A1 Feb. 3, 2022

Related U.S. Application Data

(60) Provisional application No. 62/754,241, filed on Nov. 1, 2018.

(51) Int. Cl.
*C08F 210/16* (2006.01)
*C08F 2/01* (2006.01)
(Continued)

(52) U.S. Cl.
CPC .......... *C08F 2/34* (2013.01); *C08F 2/01* (2013.01); *C08F 4/65904* (2013.01);
(Continued)

(58) Field of Classification Search
CPC .. C08F 4/65904; C08F 210/06; C08F 210/16; C08L 23/0815
See application file for complete search history.

(56) References Cited

U.S. PATENT DOCUMENTS

| | | |
|---|---|---|
| 5,082,634 A | 1/1992 | Raufast |
| 5,453,471 A | 9/1995 | Bernier et al. |

(Continued)

FOREIGN PATENT DOCUMENTS

| | | |
|---|---|---|
| EP | 0549252 | 6/1993 |
| WO | 1996-0009328 | 1/1996 |

(Continued)

OTHER PUBLICATIONS

Namkajorn, M. et al (2016) "Condensed Mode Cooling for Ethylene Polymerization: Part III. The Impact of Induced Condensing Agents on Particle Morphology and Polymer Properties", Macromolecular Chemistry and Physics 2016, vol. 217, pp. 1521-1528.

*Primary Examiner* — Caixia Lu
(74) *Attorney, Agent, or Firm* — ExxonMobil Technology and Engineering Company

(57) ABSTRACT

In an embodiment, a method for producing a polyolefin includes contacting a first composition and a second composition in in a line to form a third composition, wherein: the first composition comprises a contact product of a first catalyst, a second catalyst, a support, a first activator, and a diluent, wherein the mol ratio of second catalyst to first catalyst is from 60:40 to 40:60, the second composition comprises a contact product of the third catalyst, a second activator, and a second diluent, and the third composition (Continued)

comprises a mol ratio of the third catalyst to the second catalyst to the first catalyst of from 10:35:55 to 60:15:25, such as 30:20:30; introducing the third composition from the line into a gas-phase fluidized bed reactor; exposing the third composition to polymerization conditions; and obtaining a polyolefin.

17 Claims, 3 Drawing Sheets

(51) Int. Cl.
    *C08F 2/34*     (2006.01)
    *C08F 4/653*     (2006.01)
    *C08F 4/659*     (2006.01)
    *C08F 4/6592*     (2006.01)
    *C08L 23/08*     (2006.01)

(52) U.S. Cl.
    CPC ...... *C08F 4/65912* (2013.01); *C08F 4/65916* (2013.01); *C08F 4/65925* (2013.01); *C08F 4/65927* (2013.01); *C08F 210/16* (2013.01); *C08L 23/0815* (2013.01)

(56) References Cited

U.S. PATENT DOCUMENTS

| | | |
|---|---|---|
| 6,319,995 B2 | 11/2001 | Glenn et al. |
| 6,391,985 B1 | 5/2002 | Goode et al. |
| 6,605,675 B2 | 8/2003 | Mawson et al. |
| 6,608,149 B2 | 8/2003 | Mawson et al. |
| 6,689,847 B2 | 2/2004 | Mawson et al. |
| 6,747,103 B1 | 6/2004 | Vestberg et al. |
| 6,825,287 B2 | 11/2004 | Mawson et al. |
| 6,908,971 B2 | 6/2005 | Burns et al. |
| 6,956,089 B2 | 10/2005 | Mawson et al. |
| 7,803,324 B2 | 9/2010 | Burns et al. |
| 7,973,112 B2 | 7/2011 | Muruganandam et al. |
| 7,980,264 B2 | 7/2011 | Lynn |
| 7,989,562 B2 | 8/2011 | Terry et al. |
| 8,962,775 B2 | 2/2015 | Hoang et al. |
| 9,809,667 B2 | 11/2017 | Lue et al. |
| 9,850,332 B2 | 12/2017 | Lue et al. |
| 9,879,106 B2 | 1/2018 | Rix et al. |
| 9,902,790 B2 | 2/2018 | Vanderlende et al. |
| 10,308,742 B2 | 6/2019 | Lue et al. |
| 10,618,989 B2 | 4/2020 | Doufas et al. |
| 10,913,808 B2 | 2/2021 | Holtcamp et al. |
| 2010/0010179 A1 | 1/2010 | Muruganandam et al. |
| 2010/0041841 A1 | 2/2010 | Terry et al. |
| 2011/0275772 A1 | 11/2011 | Savatsky et al. |
| 2013/0053524 A1* | 2/2013 | Hoang ............ C08F 2/34 526/170 |
| 2015/0183905 A1* | 7/2015 | Savatsky ......... C08F 210/16 526/348.5 |
| 2016/0347874 A1* | 12/2016 | Boller ............ C08F 210/16 |
| 2017/0129977 A1 | 5/2017 | Martin et al. |
| 2017/0137551 A1 | 5/2017 | Pequeno et al. |
| 2017/0362353 A1 | 12/2017 | Savatsky et al. |
| 2018/0044453 A1* | 2/2018 | Jiang ............ B01J 8/20 |
| 2018/0100031 A1 | 4/2018 | Savatsky et al. |
| 2018/0155473 A1 | 6/2018 | Kuhlman |
| 2018/0155474 A1 | 6/2018 | Holtcamp et al. |
| 2018/0237554 A1 | 8/2018 | Holtcamp et al. |
| 2018/0298128 A1 | 10/2018 | Harlan et al. |
| 2019/0092886 A1 | 3/2019 | Savatsky et al. |
| 2019/0119413 A1 | 4/2019 | Holtcamp et al. |
| 2019/0256629 A1 | 8/2019 | Chandak et al. |
| 2019/0284310 A1 | 9/2019 | Pannell et al. |

FOREIGN PATENT DOCUMENTS

| | | |
|---|---|---|
| WO | 2019-046085 | 3/2019 |
| WO | 2019-241045 | 12/2019 |

* cited by examiner

ON-LINE ADJUSTMENT OF CATALYSTS BY TRIM AND OLEFIN POLYMERIZATION

CROSS-REFERENCE OF RELATED APPLICATIONS

This application is a National Phase Application claiming priority to PCT Application Serial No. PCT/US2019/058901, filed Oct. 30, 2019, which claims the benefit of U.S. Provisional Application Ser. No. 62/754,241, filed Nov. 1, 2018, the disclosures of which is are hereby incorporated by reference in its their entirety.

FIELD

The present disclosure relates to processes for polymerizing olefin(s) using dual catalyst systems. In particular, methods include combining a catalyst component slurry with a catalyst component solution to form a third catalyst composition and introducing the third composition into a polymerization reactor.

BACKGROUND

Gas-phase polymerization processes are valuable processes for polymerizing ethylene and ethylene comonomers to produce polyethylene polymer and copolymer compositions. Moreover, polymerization processes in fluidized beds are particularly economical.

It is generally known in the art that a polyolefin's composition distribution (CD) and molecular weight distribution (MWD) affects attributes of the polyolefin. To reduce or to avoid certain trade-off among desirable attributes, bimodal polymers have become increasingly important in the polyolefins industry, with a variety of manufacturers offering products of this type. Whereas older technology relied on two-reactor systems to generate such material, advances in catalyst design and support technology have allowed for the development of single-reactor bimetallic catalyst systems capable of producing bimodal polyethylene. These systems are attractive not only from a cost perspective and ease of use, but also for the polyethylene compositions that are produced.

A number of methodologies used for delivering catalysts to reactors involve the catalyst being supported on an inert carrier such as silica. However, large particles (>25 micrometers) of the support material can be found in the finished polymer product. These particles may adversely affect polymer properties. This has been observed in film applications where silica particles appear as defects or gels.

A supported catalyst is added to a diluent to form a catalyst slurry and pumped to a polymerization reactor. A high solids concentration within the catalyst slurry is desirable to reduce the amount of slurry. A reduction in the amount of slurry reduces transportation expenses and also reduces the amount of diluent that must be ultimately isolated and either discarded or recycled. This separation process is timely and can greatly increase capital cost.

However, a high solids concentration typically increases the slurry viscosity. A high solids concentration also increases the amount of foaming which is typically generated in a catalyst slurry vessel. A high slurry viscosity and foaming often cause handling problems, storage problems as well as reactor injection problems.

Low viscosity diluents can be added to the slurry to reduce the viscosity. However, the reduced viscosity promotes settling of the slurry in the solution, which can result in plugging of reactor components and accumulation of solids on the walls of catalyst slurry vessels.

A second catalyst solution can be added (i.e. "trimmed") to the slurry to adjust one or more properties "in-situ" of polymer being formed in a reactor. Such "trim" processes are very economical because they do not require a polymerization to cease in order to adjust polymer properties in the event a catalyst system is not behaving a desirable way. However, a second catalyst is typically delivered to the slurry as a low viscosity solution, which can promote settling of the slurry solution and subsequent gelling and/or plugging of reactor components.

There is a need for polymerization processes utilizing slurry solutions that allow for on-line adjustment of trim rates and other process conditions in order to form low density polyolefins.

References for citing in an Information Disclosure Statement (37 CFR 1.97(h)): include U.S. Provisional Patent applications having the following serial numbers: Ser. No. 61/938,466, by Ching-Tai Lue et al.; Ser. No. 61/938,472, by Ching-Tai Lue et al.; Ser. No. 61/981,291, by Francis C. Rix et al.; Ser. No. 61/985,151, by Francis C. Rix et al.; Ser. No. 62/032,383, by Sun-Chueh Kao et al.; Ser. No. 62/087,905, by Francis C. Rix et al.; Ser. No. 62/088,196, by Daniel P. Zilker, Jr. et al.; Ser. No. 62/087,911, by Ching-Tai Lue et al.; and Ser. No. 62/087,914, by Francis C. Rix; U.S. Pat. Nos. 6,956,089; 6,689,847; and U.S. Patent Publication No. 2016/0347874.

SUMMARY

In another embodiment, a method for producing a polyolefin is provided. The method includes contacting a first composition and a second composition in a line to form a third composition, wherein: the first composition comprises a contact product of a first catalyst, a second catalyst, a support, a first activator, and a diluent, wherein the mol ratio of second catalyst to first catalyst is from 60:40 to 40:60, the second composition comprises a contact product of the third catalyst, a second activator, and a second diluent, and the third composition comprises a mol ratio of the third catalyst to the second catalyst to the first catalyst of from 10:35:55 to 60:15:25, such as 30:20:30; introducing the third composition from the line into a gas-phase fluidized bed reactor; exposing the third composition to polymerization conditions; and obtaining a polyolefin.

In another embodiment, a method for producing a polyolefin is provided. The method includes contacting a first composition and a second composition in a line to form a third composition, wherein: the first composition comprises a contact product of a first catalyst, a second catalyst, a support, a first activator, and a diluent, wherein the mol ratio of the second catalyst to the first catalyst is from 60:40 to 40:60, the second composition comprises a contact product of the second catalyst, a second activator, and a second diluent, and the third composition comprises a mol ratio of the second catalyst to the first catalyst of from 60:40 to 90:10; introducing the third composition from the line into a gas-phase fluidized bed reactor; exposing the third composition to polymerization conditions; contacting the third composition and a fourth composition in the line to form a fifth composition, wherein: the fourth composition comprises a contact product of a third catalyst, a third activator, and a third diluent, and the fifth composition comprises a mol ratio of the third catalyst to the first catalyst of from 2:1 to 1:10; introducing the fifth composition from the line into the gas-phase fluidized bed reactor; exposing the fifth composition to polymerization conditions; and obtaining a polyolefin.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

DETAILED DESCRIPTION

Figure 1:
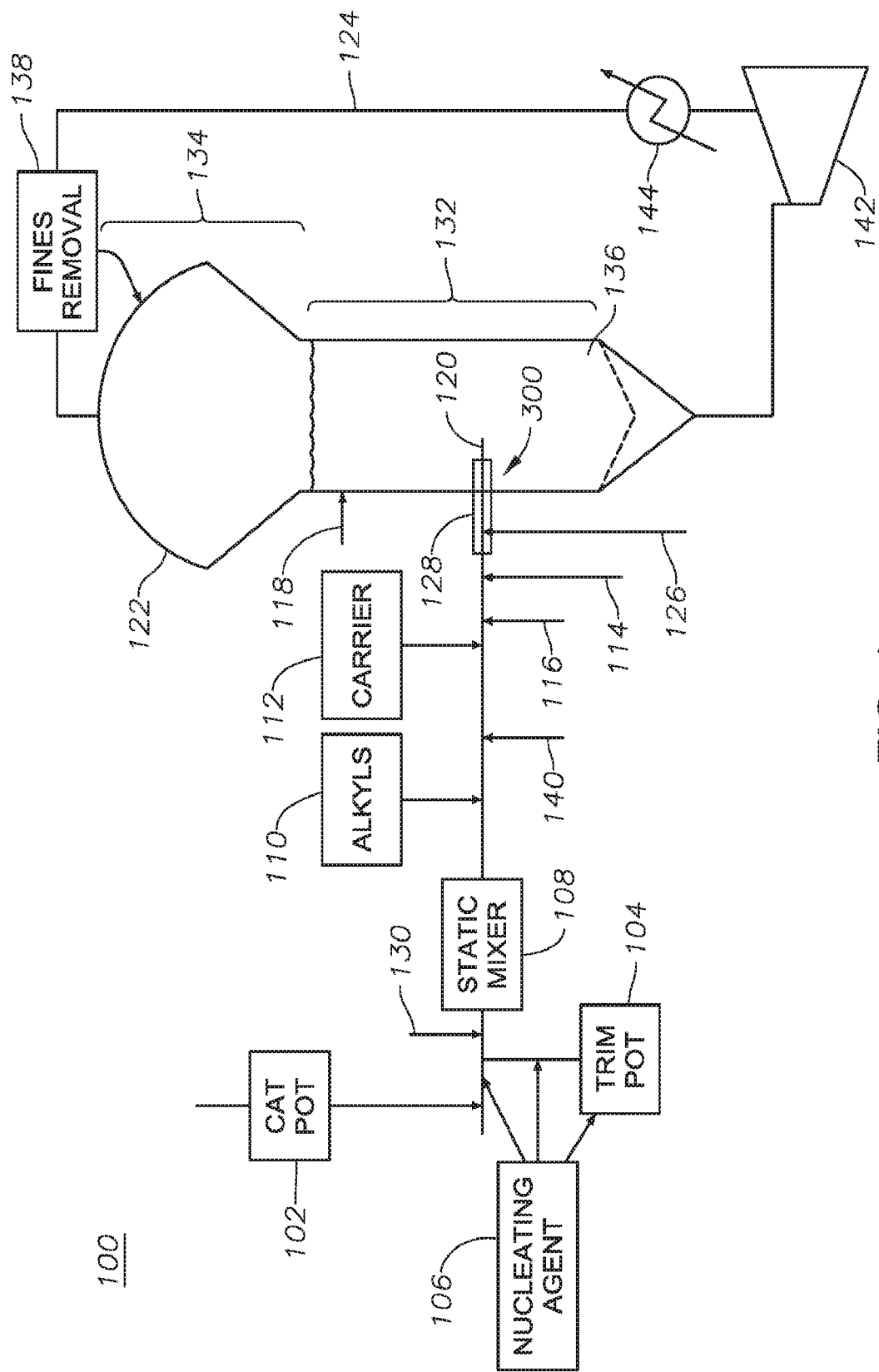
FIG. 1 is a schematic of a gas-phase reactor system, according to one embodiment.

The present disclosure provides processes for producing polyethylene and ethylene copolymers comprising polymerizing ethylene by using mixed catalyst systems with properties tunable by the presence of three different catalysts, such as in a gas-phase fluidized bed reactor.

Melt Index (MI), for example, is indicative of a polymer's molecular weight and the Melt Index Ratio (MIR) is indicative of the molecular weight distribution. A polymer that exhibits a higher MI has a shorter polymer chain length. As MIR increases, the molecular weight distribution (MWD) of the polymer broadens. A polymer that exhibits a narrower molecular weight distribution has a lower MIR.

MIR is High Load Melt Index (HLMI) divided by MI as determined by ASTM D1238. MI, also referred to as $I_2$, reported in g/10 min, is determined according to ASTM D1238, 190° C., 2.16 kg load. HLMI, also referred to as $I_{21}$, reported in g/10 min is determined according to ASTM D1238, 190° C., 21.6 kg load.

The present disclosure provides processes for forming polyethylene including polymerizing ethylene in the presence of a catalyst system in a reactor, where the catalyst system includes a first catalyst, a second catalyst, and a third catalyst. The techniques include adjusting reactor conditions, such as an amount of second catalyst fed to the reactor to control MI, density, and MIR of the polyethylene.

By adding an additional catalyst system, the change in MI of each independent system results in a change in the breadth of the molecular weight distribution. Changing this breadth affects the MIR of the final product and may be used to tune the product properties.

As used herein, Mn is number average molecular weight, Mw is weight average molecular weight, and Mz is z average molecular weight, wt % is weight percent, and mol % is mole percent. Unless otherwise noted, all average molecular weights (e.g., Mw, Mn, Mz) are reported in units of g/mol. The MWD, also referred to as polydispersity index (PDI), is defined to be Mw divided by Mn.

Unless otherwise indicated, "catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Catalyst productivity is typically measured for batch polymerizations. Unless otherwise indicated, "catalyst activity" is a measure of how active the catalyst is and is reported as the mass of product polymer (P) produced per mole of catalyst (cat) used (kgP/molcat) or as the mass of product polymer (P) produced per mass of catalyst (cat) used (gP/gcat). Catalyst activity is typically measured for continuous polymerizations. Unless otherwise indicated, "conversion" is the amount of monomer that is converted to polymer product, and is reported as mol % and is calculated based on the polymer yield and the amount of monomer fed into the reactor.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For the purposes of the present disclosure, ethylene shall be considered an α-olefin.

For purposes of the present disclosure and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

Unless otherwise indicated, room temperature is 23° C.

"Different" or "not the same" as used to refer to R groups in any formula herein (e.g., $R^2$ and $R^8$ or $R^4$ and $R^{10}$) or any substituent herein indicates that the groups or substituents differ from each other by at least one atom or are different isomerically.

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane.

A "catalyst system" is a combination of at least two catalyst compounds, an activator, an optional co-activator, and an optional support material. For the purposes of the present disclosure, when catalyst systems are described as comprising neutral stable forms of the components, it is well understood by one of ordinary skill in the art, that the ionic form of the component is the form that reacts with the monomers to produce polymers. Catalyst systems, catalysts, and activators of the present disclosure are intended to embrace ionic forms in addition to the neutral forms of the compounds/components.

A metallocene catalyst is an organometallic compound with at least one π-bound cyclopentadienyl moiety (or substituted cyclopentadienyl moiety) and more frequently two π-bound cyclopentadienyl moieties or substituted cyclopentadienyl moieties bonded to a transition metal.

In the description herein, the metallocene catalyst may be described as a catalyst precursor, a pre-catalyst compound, metallocene catalyst compound or a transition metal compound, and these terms are used interchangeably. An "anionic ligand" is a negatively charged ligand which donates one or more pairs of electrons to a metal ion.

For purposes of the present disclosure, in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

"Alkoxides" include an oxygen atom bonded to an alkyl group that is a $C_1$ to $C_{10}$ hydrocarbyl. The alkyl group may be straight chain, branched, or cyclic. The alkyl group may be saturated or unsaturated. In at least one embodiment, the alkyl group may comprise at least one aromatic group.

"Asymmetric" as used in connection with the instant indenyl compounds means that the substitutions at the 4 positions are different, or the substitutions at the 2 positions are different, or the substitutions at the 4 positions are different and the substitutions at the 2 positions are different.

The properties and performance of the polyethylene may be advanced by the combination of: (1) varying reactor conditions such as reactor temperature, hydrogen concentration, comonomer concentration, and so on; and (2) selecting and feeding a triple catalyst system having a first catalyst, second catalyst, and third catalyst trimmed or not with the first catalyst, or the second catalyst, or the third catalyst.

With respect to at least one embodiment of the catalyst system, the first catalyst is a high molecular weight component and the second catalyst is a low molecular weight component, and the third catalyst is a high molecular weight component. In other words, the first catalyst may provide primarily for a high molecular-weight portion of the polyethylene and the second catalyst may provide primarily for a low molecular weight portion of the polyethylene. In at least one embodiment, a triple catalyst system is present in a catalyst pot of a reactor system, and a molar ratio of a first catalyst to a second catalyst of the catalyst system, or a molar ratio of a second catalyst to a first catalyst of the catalyst system, is from 99:1 to 1:99, such as from 90:10 to 10:90, such as from 85:15 to 50:50, such as from 75:25 to 50:50, such as from 60:40 to 40:60. The second catalyst (or the first catalyst) can be added to a polymerization process as a trim catalyst to adjust the molar ratio of first catalyst to second catalyst (or to adjust the molar ratio of the second catalyst to first catalyst).

A molar ratio of the first catalyst to a third catalyst of the catalyst system, or a molar ratio of a third catalyst to a first catalyst of the catalyst system, is from 99:1 to 1:99, such as from 90:10 to 10:90, such as from 85:15 to 50:50, such as from 75:25 to 50:50, such as from 60:40 to 40:60. The third catalyst (or the first catalyst) can be added to a polymerization process as a trim catalyst to adjust the molar ratio of first catalyst to third catalyst (or to adjust the molar ratio of the third catalyst to first catalyst). In at least one embodiment, the first catalyst, the second catalyst, and the third catalyst are each a metallocene catalyst compound.

Hence, in at least one embodiment, metallocene bis(n-propylcyclopentadienyl) Hafnium (IV) dimethyl (also referred to as "HfP"), shown as structure (I) below may be selected as the first catalyst to produce a high molecular weight (HMW) component of the polymer. As used herein, an HMW polymer is a polymer having an Mw value of 110,000 g/mol or greater. In some instances, the first catalyst may be fed in slurry to the polymerization reactor. A second catalyst such as the metallocene meso and rac enantiomers of di(1-ethylindenyl) zirconium dimethyl (collectively referred to as EtInd), shown as structures (IIA) and (II-B) below, may be selected to produce a low molecular weight (LMW) component of the polymer. As used herein, an LMW polymer is a polymer having an Mw value of 110,000 g/mol or less. The second catalyst can be included in the same catalyst system as the first catalyst, e.g., may be co-supported with the second catalyst. A third catalyst such as the metallocene Catalyst III or dimethylsilyl-bis(trimethylsilyl-methylenecyclopentadienyl)hafnium dimethyl, or meso or rac enantiomers of that metallocene, shown as structure (III) below, may be selected to produce a high molecular weight component of the polymer. Some or all of the first catalyst, and/or second catalyst, and/or third catalyst may be fed as a trim catalyst into the catalyst slurry (e.g., in-line/on-line) having the first catalyst, second catalyst, and/or third catalyst en route to the polymerization reactor.

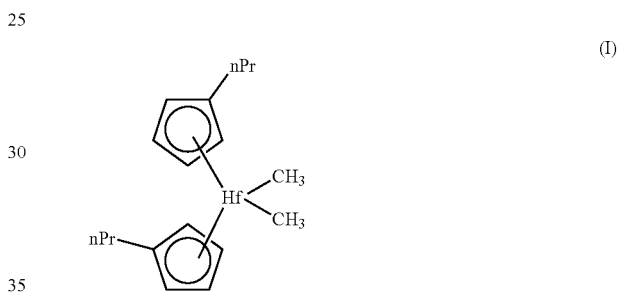

(I)

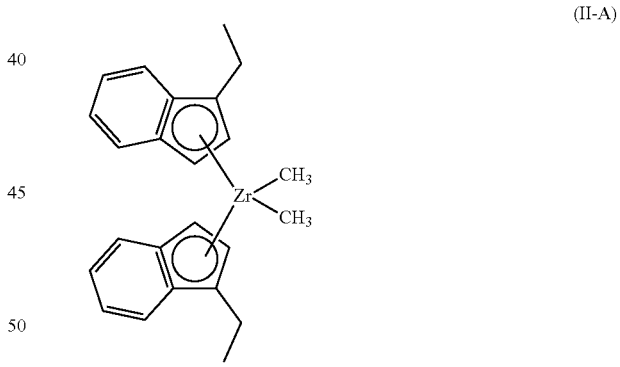

(II-A)

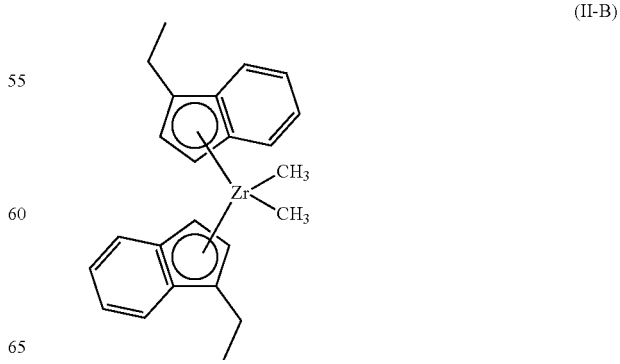

(II-B)

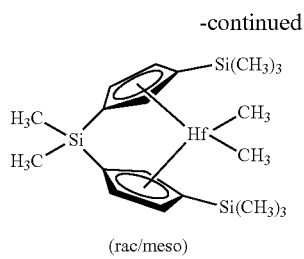

(III)

(rac/meso)

Of course, other metallocene catalysts (or non metallocene catalysts), as described herein, may be selected, and other catalyst system configurations carried out. The appropriate metallocene catalysts selected may depend on the specified properties of the polymer and the desired subsequent applications of the formed polymer resins, such as for pipe applications, packaging, film extrusion and cosmetics, blow-molding, injection molding, rotation molding applications, and so forth. The catalysts selected may include catalysts that promote good (high) or poor (low) incorporation of comonomer (e.g., 1-hexene) into the polyethylene, have a relatively high response to hydrogen concentration in the reactor or a relatively low response to reactor hydrogen concentration, and so forth. As used herein, good/high comonomer incorporation refers to a polyethylene formed by a process of the present disclosure, where the polyethylene has a comonomer content of 7 wt % or greater. As used herein, poor/low comonomer incorporation refers to a polyethylene formed by a process of the present disclosure, where the polyethylene has a comonomer content of less than 7 wt %.

By using structures such as EtInd as the second catalyst trimmed on-line at various ratios onto slurry feeding the first catalyst such as the first metallocene catalyst HfP, or vice versa, followed by Catalyst III as the third catalyst trimmed on-line at various ratios onto slurry feeding the first metallocene catalyst HfP, along with varying reactor conditions involving temperature, reaction mixture component concentrations, and the like, beneficial polyethylene products may be formed.

In at least one embodiment, a reverse trim is employed considering the LMW catalyst species EtInd as the first catalyst and the HMW catalyst species HfP as the second catalyst or catalyst trim. The third catalyst is Catalyst III. Additionally, it should also be contemplated that for the distinct catalysts selected, some of the second catalyst may be initially co-deposited with the first catalyst on a common support, and the remaining amount of the first catalyst or second catalyst added as trim. Moreover, it should also be contemplated that for the distinct catalysts selected, some of the third catalyst may be initially co-deposited with the first catalyst on a common support, and the remaining amount of the third catalyst added as trim.

In at least one embodiment, the amount of first catalyst, second catalyst, or third catalyst fed (or a catalyst trim ratio), and the reactor conditions (e.g., temperature and hydrogen concentration), may be varied to give a range of MI and MIR while maintaining polyethylene density. The embodiments may advantageously hold a broad range of MI's with the same catalyst system, e.g., the same triple catalyst system. For a catalyst system fed to the polymerization reactor, the polymer MI, MIR, density and CD may be controlled by varying reactor conditions such as the reactor mixture including operating temperature, hydrogen concentration, and comonomer concentration in the reaction mixture.

Table 1 summarizes some example aspects of reactor control with respect to polyethylene properties. For instance, the hydrogen/ethylene (H2/C2) weight ratio or mol ratio may be an adjustment or control knob or a "primary adjustment knob", for polyethylene MI adjustment. The comonomer-ethylene (e.g., C6/C2) weight ratio or mol ratio may be an adjustment or control knob or a "primary adjustment knob", for polyethylene density. The reactor temperature, and the weight or mol ratio of the two catalysts (or the catalyst trim ratio) may be an adjustment or control knob for the polyethylene MIR. Other adjustment and control points are considered. Moreover, a range of MIR values of the polymer can be considered for a given catalyst system used to produce the polymer. Other polymer properties such as density and MI may be calibrated. Furthermore, the techniques for reactor control described herein including the determinants considered in Table 1 may apply to (1) polyethylene product development, (2) direct control of the reactor during the actual production of the polyethylene, (3) targeted formulations development for reactor conditions for (a) various catalyst systems, (b) amounts of catalyst systems, (c) polyethylene grades or products, and so forth.

TABLE 1

| | Reactor Control | | | |
|---|---|---|---|---|
| | Catalyst Ratio | Temperature | C6/C2 | H2/C2 |
| MI | | | | X |
| Density | | | X | |
| MIR | X | X | | |

Exemplary ranges of MIR include 10 to 80, such as 15 to 70, such as 20 to 70, such as 20 to 65. Exemplary ranges of MI (grams/10 minutes) include 0.1 to 4 (e.g., for film), 5 to 50 or 5 to 100 (e.g., for molding such as rotational and/or injection molding), and so on. Exemplary ranges for density include 0.915 g/cm³ to 0.935 g/cm³, 0.912 g/cm³ to 0.940 g/cm³, 0.910 g/cm³ to 0.945 g/cm³, and the like.

Herein, at least one embodiment addresses the importance of developing well-controlled techniques for the formation of polyethylene copolymers holding a MWDxCD. Therefore, improving the physical properties of polymers with the tailored MWDxCD can be beneficial for commercially desirable products. Without judiciously tailoring MWDx CD, polyethylene copolymers could display some compromises among the desirable attribute, such as improving stiffness to the detriment of toughness for instance. Control of these properties may be achieved for the most part by the choice of the catalyst system.

In at least one embodiment, reactor temperature may be used as a control variable for MIR adjustment. Subsequently, at the chosen reactor temperature for a starting MIR, a trim-catalyst level may be added to further increase MIR until a pre-set MIR range is reached. The component concentrations in the polymerization mixture, such as hydrogen and comonomer (e.g., ethylene) concentrations may be adjusted for specific MI and density targets of the polyethylene at the given MIR range. The amount of trim catalyst and reactor concentration adjustments may be repeated for various levels of MIR range and specific MI and density targets.

Embodiments demonstrate a novel technology to independently control a polyethylene product's MIR from its MI and density in a single reactor environment. Consequently, some polyethylene products may have a wide range of MWDxCD compositions and product attribute combinations. For instance, some of the polyethylene polymers may have the same or similar nominal MI and density but different MIR and MWD×CD. Other polyethylene polymers in the instances have the same or similar nominal MI (I-2), density, and MIR but are different in MWD×CD. In some of the instances, the MI may range from 0.1 to 5.0 g/10 min, such as from 0.5 to 1.5 g/10 min, and the density may range from 0.913 to 0.925 g/cm$^3$, or other ranges.

In at least one embodiment, the catalysts may be applied separately in a single-reactor or multiple-reactor polymerization systems. In some other embodiments, the multiple catalysts may be applied on a common support to a given reactor, applied via different supports, and/or utilized in reactor systems having a single polymerization reactor or more than one polymerization reactor, and so forth.

At least one embodiment is related to multiple catalysts, e.g., a first catalyst and a second catalyst, impregnated on a catalyst support for polymerization of monomer into a polymer. A catalyst support impregnated with multiple catalysts may be used to form polymeric materials with improved balance of properties, such as stiffness, environmental stress crack resistance (ESCR), toughness, processability, among others. Controlling the amounts and types of catalysts present on the support contributes to reach this balance. Selection of the catalysts and ratios may adjust the combined MWD of the polymer produced. The MWD can be controlled by combining catalysts giving the desired weight average molecular weight (Mw) and individual molecular weight distributions of the produced polymer. For example, the typical MWD for linear metallocene polymers is 2.5 to 3.5. Blend studies indicate it would be desirable to broaden this distribution by employing mixtures of catalysts that each provides different average molecular weights. The ratio of the Mw for a LMW component and a HMW component would be between 1:1 and 1:10, or about 1:2 and 1:5. When a support is impregnated with multiple catalysts, new polymeric materials with improved balance of stiffness, toughness and processability can be achieved, e.g., by controlling the amounts and types of catalysts present on the support. Appropriate selection of the catalysts and ratios may be used to adjust the MWD, short chain branch distribution (SCBD), and long chain branch distribution (LCBD) of the polymer, for example, to provide a polymer with a broad orthogonal composition distribution (BOCD). The MWD, SCBD, and LCBDs would be controlled by combining catalysts with the appropriate Mw, comonomer incorporation, and long chain branching (LCB) formation under the conditions of the polymerization. Polymers having a BOCD in which the comonomer is incorporated in the HMW chains can lead to improved physical properties, such as processability, stiffness, toughness, ESCR, and so forth. Controlled techniques for forming polyethylene copolymers having a broad orthogonal composition distribution may be beneficial.

A number of catalyst compositions containing single site, e.g., metallocene, catalysts have been used to prepare polyethylene copolymers, producing relatively homogeneous copolymers at good polymerization rates. In contrast to traditional Ziegler-Natta catalyst compositions, single site catalyst compositions, such as metallocene catalysts, are catalytic compounds in which each catalyst molecule contains one or only a few polymerization sites. Single site catalysts often produce polyethylene copolymers that have a narrow molecular weight distribution. Although there are single site catalysts that can produce broader molecular weight distributions, these catalysts often show a narrowing of the molecular weight distribution as the reaction temperature is increased, for example, to increase production rates. Further, a single site catalyst will often incorporate comonomer among the molecules of the polyethylene copolymer at a relatively uniform rate. The MWD and the amount of comonomer incorporation can be used to determine a SCBD. For an ethylene alpha-olefin copolymer, short chain branching (SCB) on a polymer chain is typically created through comonomer incorporation during polymerization. The SCBD refers to the distribution of the short chains (comonomer) along the polymer backbone.

The resin is said to have a "broad SCBD" when the amount of SCB varies among the polyethylene molecules. When the amount of SCB is similar among the polyethylene molecules of different chain lengths, the SCBD is said to be "narrow". SCBD is known to influence the properties of copolymers, such as extractable content stiffness, heat sealing, toughness, environmental stress crack resistance, among others. The MWD and SCBD of a polyolefin is largely dictated by the type of catalyst used and is often invariable for a given catalyst system. Polymers with broad SCBD are in general produced by Ziegler-Natta catalysts and chromium based catalysts, whereas metallocene catalysts normally produce polymers with narrow SCBD.

Using multiple pre-catalysts that are co-supported on a single support mixed with an activator, such as a silica methylaluminoxane (SMAO), can be economically advantageous by making the polymer product in one reactor instead of multiple ones. Additionally, using a single support also eases intimate mixing of the polymers while off improving the process relative to preparing a mixture of polymers of different Mw and density independently from multiple catalysts in a single reactor. As described herein, a pre-catalyst is a catalyst compound prior to exposure to activator. The catalysts can be co-supported during a single operation, or may be used in a trim operation, in which one or more additional catalysts are added to catalysts that are supported.

Evidence of the incorporation of comonomer into a polymer is indicated by the density of a polyethylene copolymer, with lower densities indicating higher incorporation. The difference in the densities of the low molecular weight (LMW) component and the high molecular weight (HMW) component would be greater than about 0.02, or greater than about 0.04, with the HMW component having a lower density than the LMW component. Satisfactory control of the MWD and SCBD lead to the adjustment of these factors, which can be adjusted by tuning the relative amount of the pre-catalysts on the support. This may be adjusted during the formation of the pre-catalysts, for instance, by supporting two catalysts on a single support. In at least one embodiment, the relative amounts of the pre-catalysts can be adjusted by adding one of the catalyst components to a catalyst mixture progressing into the reactor in a process termed "trim." Furthermore, the amount of catalyst addition can be controlled by means of feedback of polymer property data obtained.

Moreover, a variety of polymers with different MWD, SCBD, and LCBD may be prepared from a limited number of catalysts. Indeed, the pre-catalysts should trim well onto activator supports. Two parameters that benefit trimming well are solubility in alkane solvents and rapid supportation on the catalyst slurry en-route to the reactor. This favors the use of MCNs to achieve controlled MWD, SCBD, and LCBD. Techniques for selecting catalysts that can be used to generate targeted molecular weight compositions may be employed.

In at least one embodiment, the mixed catalyst system provides a polymer with a mix of beneficial properties as a result of a tailored combination of MWD and the CD. The ability to control the MWD and the CD of the system is typically crucial in determining the processability and strength of the resultant polymer.

These factors can be tailored by controlling the MWD, which, in turn, can be adjusted by changing the relative amount of the combination of pre-catalysts on the support. This may be regulated during the formation of the pre-catalysts, for instance, by supporting the two, or more, catalysts on a single support. In at least one embodiment, the relative amounts of the pre-catalysts can be adjusted by adding one of the components as trim to a catalyst mixture progressing into the reactor. Controlling the amount of catalyst addition can be achieved by using the feedback of polymer property data.

Altogether, certain embodiments provide a polymerization system, method, and catalyst system for producing polyethylene. The techniques include polymerizing ethylene in the presence of a catalyst system in a reactor to form the polyethylene, wherein the catalyst system has a first catalyst such as metallocene catalyst, a second catalyst such as another metallocene catalyst or a non-metallocene catalyst, and a third catalyst such as another metallocene catalyst or a non-metallocene catalyst. The reactor conditions, an amount of the second catalyst (or ratio of second catalyst to first catalyst) fed to the reactor, and an amount of the third catalyst (or ratio of third catalyst to first catalyst) may be adjusted to control MI and the density of the polyethylene based on a target MIR and a desired combination of MWD and CD. The reactor conditions adjusted may be operating temperature of the reactor, a comonomer concentration and/or hydrogen concentration in the polymerization mixture in the reactor, and the like. The reactant concentrations may be adjusted to meet a MI target and/or density target of the polyethylene, for example, at a given MIR range of the polyethylene. In examples, the MI of the polyethylene is in a range from 0.5 g/10 min to 1.5 g/10 min, and the density of the polyethylene is in a range from 0.916 g/cm$^3$ to 0.93 g/cm$^3$.

In at least one embodiment, the first catalyst includes the metallocene catalyst HfP, the second catalyst is the metallocene catalyst EtInd, and the third catalyst is the metallocene Catalyst III. Further, the catalyst system may be a common supported catalyst system. Furthermore, the second catalyst may be added as a trim catalyst to a slurry having the first and second catalysts fed to the reactor, and/or the third catalyst may be added as a trim catalyst to a slurry having the first catalyst fed to the reactor. The first catalyst, the second catalyst, and the third catalyst, or a combination thereof may be impregnated on a single support. Furthermore, in certain embodiments, the first catalyst promotes polymerization of the ethylene into a high molecular weight portion of the polyethylene, the second catalyst promotes polymerization of the ethylene into a low molecular weight portion of the polyethylene, and the third catalyst promotes polymerization of the ethylene into a high molecular weight portion of the polyethylene. An amount of the second catalyst fed (or the catalyst trim ratio) to the polymerization reactor may be adjusted along with reactor conditions to control polyolefin properties at a given MIR, for instance. An amount of the third catalyst fed (or the catalyst trim ratio) to the polymerization reactor may be adjusted along with reactor conditions to control polyolefin properties at a given MIR, for instance.

In at least one embodiment, the first catalyst includes the metallocene catalyst EtInd and the second catalyst is the metallocene HfP. Further, the catalyst system may be a common supported catalyst system. Furthermore, the second catalyst may be added as a trim catalyst to a slurry having the first catalyst fed the reactor, and/or the third catalyst may be added as a trim catalyst to a slurry having the first catalyst fed to the reactor. The first catalyst, the second catalyst, the third catalyst, or a combination thereof may be impregnated on a single support. Furthermore, in certain embodiments, the first catalyst promotes polymerization of the ethylene into a low molecular weight portion of the polyethylene, the second catalyst promotes polymerization of the ethylene into a high molecular weight portion of the polyethylene, and the third catalyst promotes polymerization of the ethylene into a high molecular weight portion of the polyethylene. An amount of the second catalyst fed (or the catalyst trim ratio) to the polymerization reactor may be adjusted along with reactor conditions to control polyolefin properties at a given MIR, for instance. An amount of the third catalyst fed (or the catalyst trim ratio) to the polymerization reactor may be adjusted along with reactor conditions to control polyolefin properties at a given MIR, for instance.

In some embodiments, the trim catalyst may be added to a slurry, wherein the trim catalyst is free of a support. The trim catalyst may be the first catalyst, the second catalyst, the third catalyst, or a combination thereof.

Other embodiments provide for a method of producing polyethylene, including: polymerizing ethylene in the presence of a catalyst system in a reactor to form polyethylene, where the catalyst system comprises a first catalyst, a second catalyst, a third catalyst, or a combination thereof; and adjusting reactor temperature, reactor hydrogen concentration, and/or an amount of the trim catalyst (first catalyst, second catalyst, third catalyst, or a combination thereof) fed to the reactor, to give a range of MIR of the polyethylene while maintaining density and MI of the polyethylene. An initial amount of the second catalyst and/or third catalyst may be co-deposited with first catalyst prior to being fed to the reactor. The adjusted amount of the second catalyst fed to the reactor may be a catalyst trim ratio. The adjusted amount of the third catalyst fed to the reactor may be a catalyst trim ratio. In certain embodiments, the first catalyst promotes polymerization of the ethylene into a high molecular weight portion of the polyethylene, the second catalyst promotes polymerization of the ethylene into a low molecular-weight portion of the polyethylene, and the third catalyst promotes polymerization of the ethylene into a high molecular weight portion of the polyethylene. In certain embodiments, the second catalyst promotes polymerization of the ethylene into a high molecular-weight portion of the polyethylene, the first catalyst promotes polymerization of the ethylene into a low molecular-weight portion of the polyethylene. In particular embodiments, the reactor hydrogen concentration as a ratio of hydrogen to ethylene in the reactor is a control variable for MI, a ratio of comonomer (e.g., 1-hexene) to ethylene in the reactor is a primary control variable for the density, and the reactor temperature and the amount of the second catalyst fed to the reactor as a catalyst trim ratio are primary control variables of the MIR. In some instances, the MIR is in the range of 20 to 70 and the density is in the range of 0.912 g/cm$^3$ to 0.940 g/cm$^3$.

At least one embodiment provides for a method of producing polyethylene, including: polymerizing ethylene in the presence of a catalyst system in a reactor to form polyethylene, wherein the catalyst system comprises a first catalyst, a second catalyst, a third catalyst, and adjusting reactor conditions and an amount of the trim catalyst fed to the reactor, to adjust the MI and/or MIR of polymer product.

Assorted catalyst systems and components may be used to generate the polymers. These are discussed in the sections to follow regarding the catalyst compounds that can be used in embodiments, including the first metallocene catalyst, the second metallocene catalyst, and the third metallocene catalyst among others; generating catalyst slurries that may be used for implementing the techniques described; supports that may be used; catalyst activators that may be used; the catalyst component solutions that may be used to add additional catalysts in trim systems; gas-phase polymerization reactor with a trim feed system; use of the catalyst composition to control product properties; polymerization processes.

Metallocene Catalyst Compounds

Metallocene catalyst compounds can include catalyst compounds having one or more Cp ligands (cyclopentadienyl and ligands isolobal to cyclopentadienyl) bound to at least one Group 3 to Group 12 metal atom, and one or more leaving group(s) bound to the at least one metal atom. As used herein, all references to the Periodic Table of the Elements and groups thereof is to the NEW NOTATION published in HAWLEYS CONDENSED CHEMICAL DICTIONARY. Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring system(s), at least a portion of which includes π-bonded systems, such as cycloalkadienyl ligands and heterocyclic analogues. The ring(s) or ring system(s) typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In a more particular exemplary embodiment, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H4 Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment; and selected from the group consisting of Sc, Ti, Zr, Hf, V, Nb, Ta, Mn, Re, Fe, Ru, Os, Co. Rh, Ir, and Ni in yet a more particular exemplary embodiment; and selected from the group consisting of Groups 4, 5, and 6 atoms in yet a more particular exemplary embodiment; and Ti, Zr, Hf atoms in yet a more particular exemplary embodiment; and Zr in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3 or +4. The groups bound to the metal atom "M" are such that the compounds described below in the formulas and structures are electrically neutral, unless otherwise indicated. The Cp ligand forms at least one chemical bond with the metal atom M to form the "metallocene catalyst compound." The Cp ligands are distinct from the leaving groups bound to the catalyst compound in that they are not highly susceptible to substitution/abstraction reactions.

The one or more metallocene catalyst compounds can be represented by the structure (IV):

$$Cp_A Cp_B MX_n \qquad (IV),$$

in which M is as described above; each X is chemically bonded to M, each Cp group is chemically bonded to M and n is 0 or an integer from 1 to 4, and either 1 or 2 in a particular exemplary embodiment.

The ligands represented by $Cp_A$ and $Cp_B$ in structure (IV) can be the same or different cyclopentadienyl ligands or ligands isolobal to cyclopentadienyl, either or both of which can contain heteroatoms and either or both of which can be substituted by a group R. In at least one specific embodiment, $Cp_A$ and $Cp_B$ are independently selected from the group consisting of cyclopentadienyl, indenyl, tetrahydroindenyl, fluorenyl, and substituted derivatives of each.

Independently, each $Cp_A$ and $Cp_B$ of structure (IV) can be unsubstituted or substituted with any one or combination of substituent groups R. Non-limiting examples of substituent groups R as used in structure (IV) as well as ring substituents in structures discussed and described below, include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with any of the catalyst structures of the present disclosure (e.g., formula (IV)) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary butyl, isopropyl, and the like. Other possible radicals include substituted alkyls and aryls such as, for example, fluoromethyl, fluroethyl, difluroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris (trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated Substituents including vinyl-terminated ligands such as, for example, 3-butenyl, 2-propenyl, 5-hexenyl, and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron, and combinations thereof. Also, a substituent group R Such as 1-butanyl can form a bonding association to the element M.

Each leaving group, or X, in the structure (IV) (and X of the catalyst structures shown below) is independently selected from halogen, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, and $C_1$ to $C_{12}$ heteroatom containing hydrocarbons and substituted derivatives thereof, in a more particular exemplary embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular exemplary embodiment; hydride, chloride, fluoride, methyl, phenyl, phenoxy, benzoxy, tosyl, fluoromethyls and fluorophenyls, in yet a more particular exemplary embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls, in yet a more particular exemplary embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls, in yet a more particular exemplary embodiment; chloride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls), in yet a more particular exemplary embodiment.

Other non-limiting examples of X groups include amides, amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O$—), hydrides, halogen ions and combinations thereof. Other examples of X ligands include alkyl groups such as cyclobutyl, cyclohexyl, methyl, heptyl, tolyl, trifluorom ethyl, tetramethylene, pentamethylene, methylidene, methyoxy, ethyoxy, propoxy, phenoxy, bis(N-methylanilide), dimethylamide, dimethylphosphide radicals and the like. In one exemplary embodiment, two or more X's form a part of a fused ring or ring system. In at least one specific embodiment, X can be a leaving group selected from the group consisting of chloride ions, bromide ions, $C_1$ to $C_{10}$ alkyls, and $C_2$ to $C_{12}$ alkenyls, carboxylates, acetylacetonates, and alkoxides.

The metallocene catalyst compound includes those of structure (IV) where $Cp_A$ and $Cp_B$ are bridged to each other by at least one bridging group, (A) such that the structure is represented by structure (V):

$Cp_A(A)Cp_BMX_n$ (V).

These bridged compounds represented by structure (V) are known as "bridged metallocenes." The elements $Cp_A$, $Cp_B$, M, X and n in structure (V) are as defined above for structure (IV); where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl, or aryl substituted to satisfy neutral valency. In at least one specific embodiment, the bridging group (A) can also include substituent groups R as defined above (for structure (IV)) including halogen radicals and iron. In at least one specific embodiment, the bridging group (A) can be represented by $C_1$ to $C_6$ alkylenes, substituted $C_1$ to $C_6$ alkylenes, oxygen, sulfur, $R_2C=R_2Si$, —$Si(R')_2Si(OR')_2$—, —$Si(R')_2$—, —$R'_2Ge$—, and RP=, where "=" represents two chemical bonds, R is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. In at least one specific embodiment, the bridged metallocene catalyst compound of structure (V) includes two or more bridging groups (A). In one or more embodiments, (A) can be a divalent bridging group bound to both $Cp_A$ and $Cp_B$ selected from divalent $C_1$ to $C_{20}$ hydrocarbyls and $C_1$ to $C_{20}$ heteroatom containing hydrocarbonyls, where the heteroatom containing hydrocarbonyls include from one to three heteroatoms.

The bridging group (A) can include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl cyclohexylphenylsilyl, t-butylcyclohexylsilyl, di(t-butylphenyl) silyl, di(p-tolyl)silyl and the corresponding moieties where the Si atom is replaced by a Ge or a C atom; as well as dimethylsilyl, diethylsilyl, dimethylgermyl and diethylgermyl.

The bridging group (A) can also be cyclic, having, for example, 4 to 10 ring members; in a more particular exemplary embodiment, bridging group (A) can have 5 to 7 ring members. The ring members can be selected from the elements mentioned above, and, in a particular embodiment, can be selected from one or more of B, C, Si, Ge, N, and O. Non-limiting examples of ring structures which can be present as, or as part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In one or more embodiments, one or two carbon atoms can be replaced by at least one of Si and Ge. The bonding arrangement between the ring and the Cp groups can be cis-, trans-, or a combination thereof.

The cyclic bridging groups (A) can be saturated or unsaturated and/or can carry one or more substituents and/or can be fused to one or more other ring structures. If present, the one or more substituents can be, in at least one specific embodiment, selected from the group consisting of hydrocarbyl (e.g., alkyl, such as methyl) and halogen (e.g., F, Cl). The one or more Cp groups to which the above cyclic bridging moieties can optionally be fused can be saturated or unsaturated, and are selected from the group consisting of those having 4 to 10, more particularly 5, 6, or 7 ring members (selected from the group consisting of C, N, O, and S in a particular exemplary embodiment) such as, for example, cyclopentyl, cyclohexyl and phenyl. Moreover, these ring structures can themselves be fused such as, for example, in the case of a naphthyl group. Moreover, these (optionally fused) ring structures can carry one or more substituents. Illustrative, non-limiting examples of these substituents are hydrocarbyl (particularly alkyl) groups and halogen atoms. The ligands $Cp_A$ and $Cp_B$ of structure (IV) and (V) can be different from each other. The ligands $Cp_A$ and $Cp_B$ of structure (IV) and (V) can be the same. The metallocene catalyst compound can include bridged mono ligand metallocene compounds (e.g., mono cyclopentadienyl catalyst components).

It is considered that the metallocene catalyst components discussed and described above include their structural or optical or enantiomeric isomers (racemic mixture), and, in one exemplary embodiment, can be a pure enantiomer. As used herein, a single, bridged, asymmetrically substituted metallocene catalyst compound having a racemic and/or meso-isomer does not, itself, constitute at least two different bridged, metallocene catalyst components.

The amount of the transition metal component of the one or more metallocene catalyst compounds in the catalyst system can range from 0.2 wt %, 0.3 wt %, 0.5 wt %, or 0.7 wt % to 1.0 wt %, 2.0 wt %, 2.5 wt %, 3.0 wt %, 3.5 wt %, or 4.0 wt %, based on the total weight of the catalyst system.

The metallocene catalyst compounds can include any suitable combination. For example, the metallocene catalyst compound can include, but is not limited to, bis(n-butylcyclopentadienyl)zirconium($CH_3$)$_2$, bis(n-butylcyclopentadienyl)$ZrCl_2$, bis(n-butylcyclopentadienyl)$ZrCl_2$, (n-propylcyclopentadienyl, tetramethylcyclopentadienyl)$ZrCl_2$, or any combinations thereof. Other metallocene catalyst compounds are contemplated.

Although the catalyst compounds may be written or shown with methyl-, chloro-, or phenyl-leaving groups attached to the central metal, it can be understood that these groups may be different. For example, each of these ligands may independently be a benzyl group (Bn), a methyl group (Me), a chloro group (Cl), a fluoro group (F), or any number of other groups, including organic groups, or heteroatom groups. Further, these ligands will change during the reaction, as a pre-catalyst is converted to the active catalyst for the reaction.

Catalyst Component Slurry

The catalyst system may include a catalyst component in a slurry, which may have an initial catalyst compound, and an added solution catalyst component that is added to the slurry. Generally, the first metallocene catalyst, the second metallocene catalyst, the third metallocene catalyst, or a combination thereof, will be supported in the initial slurry, depending on solubility. However, in at least one embodiment, the initial catalyst component slurry may have no catalysts. In this case, two or more solution catalysts may be added to the slurry to cause each to be supported.

Any number of combinations of catalyst components may be used in embodiments. For example, the catalyst component slurry can include an activator and a support, or a supported activator. Further, the slurry can include a catalyst compound in addition to the activator and the support. As noted, the catalyst compound in the slurry may be supported.

The slurry may include one or more activators and supports, and one or more catalyst compounds. For example, the slurry may include two or more activators (such as alumoxane and a modified alumoxane) and a catalyst compound, or the slurry may include a supported activator and more than one catalyst compounds. In at least one embodiment, the slurry includes a support, an activator, and two catalyst compounds. In another embodiment the slurry includes a support, an activator and two different catalyst compounds, which may be added to the slurry separately or in combination. The slurry, containing silica and alumoxane, may be contacted with a catalyst compound, allowed to react, and thereafter the slurry is contacted with another catalyst compound, for example, in a trim system.

The molar ratio of metal in the activator to metal in the catalyst compound in the slurry may be 1000:1 to 0.5:1, 300:1 to 1:1, 100:1 to 1:1, or 150:1 to 1:1. The slurry can include a support material which may be any inert particulate carrier material known in the art, including, but not limited to, silica, fumed silica, alumina, clay, talc or other support materials such as disclosed above. In at least one embodiment, the slurry contains silica and an activator, such as methyl aluminoxane ("MAO"), modified methyl aluminoxane ("MMAO"), as discussed further below.

One or more diluents or carriers can be used to facilitate the combination of any two or more components of the catalyst system in the slurry or in the trim catalyst solution. For example, the single site catalyst compound and the activator can be combined together in the presence of toluene or another non-reactive hydrocarbon or hydrocarbon mixture to provide the catalyst mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the catalyst mixture or the catalyst/activator mixture can be added to the support.

The diluent can be or include mineral oil. Mineral oil can have a density of from 0.85 g/$cm^3$ to 0.9 g/$cm^3$ at 25° C. according to ASTM D4052, such as from 0.86 g/$cm^3$ to 0.88 g/$cm^3$. Mineral oil can have a kinematic viscosity at 25° C. of from 150 cSt to 200 cSt according to ASTM D341, such as from 160 cSt to 190 cSt, such as about 170 cSt. Mineral oil can have an average molecular weight of from 400 g/mol to 600 g/mol according to ASTM D2502, such as from 450 g/mol to 550 g/mol, such as about 500 g/mol. In at least one embodiment, a mineral oil is HYDROBRITE® 380 PO White Mineral Oil ("HB380") from Sonneborn, LLC.

The diluent can further include a wax, which can provide increased viscosity to a slurry (such as a mineral oil slurry). A wax is a food grade petrolatum also known as petroleum jelly. A wax can be a paraffin wax. Paraffin waxes include SONO JELL® paraffin waxes, such as SONO JELL® 4 and SONO JELL® 9 from Sonneborn, LLC. In at least one embodiment, a slurry has 5 wt % or greater of wax, such as 10 wt % or greater, such as 25 wt % or greater, such as 40 wt % or greater, such as 50 wt % or greater, such as 60 wt % or greater, such as 70 wt % or greater. For example, a mineral oil slurry can have 70 wt % mineral oil, 10 wt % wax, and 20 wt % supported catalyst(s) (e.g., supported dual catalysts or supported triple catalyst). It has been discovered that the increased viscosity provided by a wax in a slurry, such as a mineral oil slurry, provides reduced settling of supported catalyst(s) in a vessel or catalyst pot. It has further been discovered that using an increased viscosity mineral oil slurry does not inhibit trim efficiency. In at least one embodiment, a wax has a density of from about 0.7 g/$cm^3$ (at 100° C.) to about 0.95 g/$cm^3$ (at 100° C.), such as from about 0.75 g/$cm^3$ (at 100° C.) to about 0.87 g/$cm^3$ (at 100° C.). A wax can have a kinematic viscosity of from 5 $mm^2$/s (at 100° C.) to about 30 $mm^2$/s (at 100° C.). A wax can have a boiling point of about 200° C. or greater, such as about 225° C. or greater, such as about 250° C. or greater. A wax can have a melting of from about 25° C. to about 100° C., such as from about 35° C. to about 80° C.

The catalyst is not limited to a slurry arrangement, as a mixed catalyst system may be made on a support and dried. The dried catalyst system can then be fed to the reactor through a dry feed system.

Support

As used herein, the terms "support" and "carrier" are used interchangeably and refer to any support material, including a porous support material, such as talc, inorganic oxides, and inorganic chlorides. The one or more single site catalyst compounds of the slurry can be supported on the same or separate supports together with the activator, or the activator can be used in an unsupported form, or can be deposited on a support different from the single site catalyst compounds, or any combination thereof. This may be accomplished by any technique commonly used in the art. There are various other suitable methods for supporting a single site catalyst compound. For example, the single site catalyst compound can contain a polymer bound ligand. The single site catalyst compounds of the slurry can be spray dried. The support used with the single site catalyst compound can be functionalized.

The support can be or include one or more inorganic oxides, for example, of Group 2, 3, 4, 5, 13, or 14 elements. The inorganic oxide can include, but is not limited to silica, alumina, titania, zirconia, boria, zinc oxide, magnesia, or any combination thereof. Illustrative combinations of inorganic oxides can include, but are not limited to, alumina-silica, silica-titania, alumina-silica-titania, alumina-zirconia, alumina-titania, and the like. The support can be or include silica, alumina, or a combination thereof. In at least one embodiment described herein, the support is silica.

Suitable commercially available silica supports can include, but are not limited to, ES757, ES70, and ES70W available from PQ Corporation. Suitable commercially available silica-alumina Supports can include, but are not limited to, SIRAL® 1, SIRAL® 5, SIRAL® 10, SIRAL® 20, SIRAL® 28M, SIRAL® 30, and SIRAL® 40, available from SASOL®. Generally, catalyst supports comprising silica gels with activators, such as methylaluminoxanes (MAOs), are used in the trim systems described, since these supports may function better for co-supporting solution carried catalysts.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, [H(OEt$_2$)$_2$]+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In at least one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Activator

As used herein, the term "activator" may refer to any compound or combination of compounds, supported, or unsupported, which can activate a single site catalyst compound or component. Such as by creating a cationic species of the catalyst component. For example, this can include the abstraction of at least one leaving group (the "X" group in the single site catalyst compounds described herein) from the metal center of the single site catalyst compound/component. The activator may also be referred to as a "co-catalyst". For example, the activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as tri (n-butyl)ammonium tetrakis(pentafluorophenyl) boron, a trisperfluorophenyl boron metalloid precursor, a trisperfluoronaphthyl boron metalloid precursor, or any combinations thereof.

Aluminoxanes can be described as oligomeric aluminum compounds having Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. MMAOs are generally more soluble in aliphatic solvents and more stable during storage. There are a variety of methods for preparing aluminoxane and modified aluminoxanes.

As noted above, one or more organo-aluminum compounds such as one or more alkylaluminum compounds can be used in conjunction with the aluminoxanes. For example, alkylaluminum species that may be used are diethylaluminum ethoxide, diethylaluminum chloride, and/or disobutylaluminum hydride. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like.

Catalyst Component Solution (the "Trim Solution")

The catalyst component solution may include only catalyst compound(s), such as a metallocene, or may include an activator. In at least one embodiment, the catalyst compound(s) in the catalyst component solution is unsupported. The catalyst solution used in the trim process can be prepared by dissolving the catalyst compound and optional activators in a liquid solvent. The liquid solvent may be an alkane, such as a $C_5$ to $C_{30}$ alkane, or a $C_5$ to $C_{10}$ alkane. Cyclic alkanes such as cyclohexane and aromatic compounds such as toluene may also be used. Mineral oil may be used as a solvent alternatively or in addition to other alkanes such as a $C_5$ to $C_{30}$ alkane. Mineral oil can have a density of from 0.85 g/cm$^3$ to 0.9 g/cm$^3$ at 25° C. according to ASTM D4052, such as from 0.86 g/cm$^3$ to 0.88 g/cm$^3$. Mineral oil can have a kinematic viscosity at 25° C. of from 150 cSt to 200 cSt according to ASTM D341, such as from 160 cSt to 190 cSt, such as about 170 cSt. Mineral oil can have an average molecular weight of from 400 g/mol to 600 g/mol according to ASTM D2502, such as from 450 g/mol to 550 g/mol, such as about 500 g/mol. In at least one embodiment, a mineral oil is HYDROBRITE® 380 PO White Mineral Oil ("HB380") from Sonneborn, LLC.

The solution employed should be liquid under the conditions of polymerization and relatively inert. In at least one embodiment, the liquid utilized in the catalyst compound solution is different from the diluent used in the catalyst component slurry. In another embodiment, the liquid utilized in the catalyst compound solution is the same as the diluent used in the catalyst component solution.

If the catalyst solution includes both activator and catalyst compound, the ratio of metal in the activator to metal in the catalyst compound in the solution may be 1000:1 to 0.5:1, 300:1 to 1:1, or 150:1 to 1:1. In various embodiments, the activator and catalyst compound are present in the solution at up to about 90 wt %, at up to about 50 wt %, at up to about 20 wt %, such as at up to about 10 wt %, at up to about 5 wt %, at less than 1 wt %, or between 100 ppm and 1 wt %, based upon the weight of the solvent and the activator or catalyst compound.

The catalyst component solution can include any one of the catalyst compound(s) of the present disclosure. As the catalyst is dissolved in the solution, a higher solubility is desirable. Accordingly, the catalyst compound in the catalyst component solution may often include a metallocene, which may have higher solubility than other catalysts.

In the polymerization process, described below, any of the above described catalyst component containing solutions may be combined with any of the catalyst component containing slurry/slurries described above. In addition, more than one catalyst component solution may be utilized.

Continuity Additive/Static Control Agent

In gas-phase polyethylene production processes, it may be desirable to use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used.

Control agents such as aluminum stearate may be employed. The static control agent used may be selected for its ability to receive the static charge in the fluidized bed without adversely affecting productivity. Other suitable static control agents may also include aluminum distearate, ethoxylated amines, and anti-static compositions such as those provided by Innospec Inc. under the trade name OCTASTAT. For example, OCTASTAT 2000 is a mixture of a polysulfone copolymer, a polymeric polyamine, and oil soluble sulfonic acid.

Any of the mentioned control agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc) family of products).

Other useful continuity additives include ethyleneimine additives useful in embodiments disclosed herein may include polyethyleneimines having the following general formula:

where n may be from about 10 to about 10,000. The polyethyleneimines may be linear, branched, or hyper branched (e.g., forming dendritic or arborescent polymer structures). They can be a homopolymer or copolymer of ethyleneimine or mixtures thereof (referred to as polyethyleneimine(s) hereafter). Although linear polymers represented by the chemical formula —$(CH_2—CH_2—NH)n$- may be used as the polyethyleneimine, materials having primary, secondary, and tertiary branches can also be used. Commercial polyethyleneimine can be a compound having branches of the ethyleneimine polymer.

Gas Phase Polymerization Reactor

FIG. 1 is a schematic of a gas-phase reactor system 100, showing the addition of at least two catalysts, at least one of which is added as a trim catalyst. The catalyst component slurry, such as a mineral oil slurry, including at least one support and at least one activator, and at least one catalyst compound (such as two different catalyst compounds) may be placed in a vessel or catalyst pot (cat pot) 102. The mineral oil slurry can further include a wax, which can provide increased viscosity to the mineral oil slurry, which provides for use of a slurry roller of conventional trim processes to be merely optional. Lower viscosity slurries of conventional trim processes involve rolling the slurry cylinders immediately prior to use. Not using a slurry roller can provide reduced or eliminated foam when the slurry is transferred down in pressure to the slurry vessel (e.g., cat pot 102).

Paraffin waxes can include SONO JELL® paraffin waxes, such as SONO JELL® 4 and SONO JELL® 9 from Sonneborn, LLC. SONO JELL® paraffin waxes are compositions that typically contain 10 wt % or more of wax and up to 90 wt % of mineral oil. For example, a SONO JELL® paraffin wax can be 20 wt % wax and 80 wt % mineral oil. In at least one embodiment, a mineral oil slurry has 5 wt % or greater of wax, such as 10 wt % or greater, such as 25 wt % or greater, such as 40 wt % or greater, such as 50 wt % or greater, such as 60 wt % or greater, such as 70 wt % or greater. For example, a mineral oil slurry can have 70 wt % mineral oil, 10 wt % wax, and 20 wt % supported dual catalyst. It has been discovered that the increased viscosity provided by including a wax in the mineral oil slurry provides reduced settling of supported dual catalyst in a vessel or catalyst pot. It has further been discovered that using an increased viscosity mineral oil slurry does not inhibit trim efficiency.

Cat pot 102 is an agitated holding tank designed to keep the solids concentration homogenous. In at least one embodiment, cat pot 102 is maintained at an elevated temperature, such as from 30° C. to 75° C., such as from 40° C. to 45° C., for example about 43° C. or about 60° C. Elevated temperature can be obtained by electrically heat tracing cat pot 102 using, for example, a heating blanket. Cat pot 102 that is maintained at an elevated temperature can provide a wax-containing mineral oil slurry that has slurry stability for 6 days or more, e.g., a settling rate of supported catalyst of 40% or less after 6 days. Furthermore, it has been discovered that maintaining cat pot 102 at an elevated temperature can also reduce or eliminates foaming, in particular when a wax is present in the mineral oil slurry. Without being bound by theory, a synergy provided by increased viscosity of the slurry provided by the wax and decreased viscosity provided by elevated temperature of the slurry can provide the reduced or eliminated foam formation in a cat pot vessel. Maintaining cat pot 102 at an elevated temperature can further reduce or eliminate solid residue formation on vessel walls which could otherwise slide off of the walls and cause plugging in downstream delivery lines. In at least one embodiment, cat pot 102 has a volume of from about 300 gallons to 2,000 gallons, such as from 400 gallons to 1,500 gallons, such as from 500 gallons to 1,000 gallons, such as from 500 gallons to 800 gallons, for example about 500 gallons.

In at least one embodiment, cat pot 102 is also maintained at pressure of 25 psig or greater, such as from 25 psig to 75 psig, such as from 30 psig to 60 psig, for example about 50 psig. Conventional trim processes involve slurry cylinders rolled at 25 psig, and foam is created when transferred down in pressure to the slurry vessel. It has been discovered that operating a slurry vessel (e.g., cat pot 102) at higher pressures can reduce or prevent foam.

In at least one embodiment, piping 130 and piping 140 of gas-phase reactor system 100 is maintained at an elevated temperature, such as from 30° C. to 75° C., such as from 40° C. to 45° C., for example about 43° C. or about 60° C. Elevated temperature can be obtained by electrically heat tracing piping 130 and or piping 140 using, for example, a heating blanket. Maintaining piping 130 and or piping 140 at an elevated temperature can provide the same or similar benefits as described for an elevated temperature of cat pot 102.

A catalyst component solution, prepared by mixing a solvent and at least one catalyst compound and/or activator, is placed in another vessel, such as a trim pot 104. Trim pot 104 can have a volume of from about 100 gallons to 2,000 gallons, such as from 100 gallons to 1,500 gallons, such as from 200 gallons to 1,000 gallons, such as from 200 gallons to 500 gallons, for example about 300 gallons. Trim pot 104 can be maintained at an elevated temperature, such as from 30° C. to 75° C., such as from 40° C. to 45° C., for example about 43° C. or about 60° C. Elevated temperature can be obtained by electrically heat tracing trim pot 104 using, for example, a heating blanket. Maintaining trim pot 104 at an elevated temperature can provide reduced or eliminated foaming in piping 130 and or piping 140 when the catalyst component slurry from cat pot 102 is combined in-line (also referred to herein as "on-line") with the catalyst component solution from trim pot 104.

It has been discovered that if the catalyst component slurry includes a wax, then it is advantageous that a diluent of the catalyst component solution have a viscosity that is greater than the viscosity of an alkane solvent, such as isopentane ($iC_5$) or isohexane ($iC_6$). Using $iC_5$ or $iC_6$ as a diluent in a trim pot can promote catalyst settling and static mixer plugging. Accordingly, in at least one embodiment, the catalyst component slurry of cat pot 102 includes a wax, as described above, and the catalyst component solution of trim pot 104 includes a diluent that is mineral oil. It has been discovered that trim efficiency is maintained or improved using wax in the catalyst component slurry and mineral oil in the catalyst component solution. Furthermore, use of wax and mineral oil reduces or eliminates the amount of $iC_5$ and $iC_6$ used in a trim process, which can reduce or eliminate emissions of volatile material (such as $iC_5$ and $iC_6$). Mineral oil can have a density of from 0.85 g/cm$^3$ to 0.9 g/cm$^3$ at 25° C. according to ASTM D4052, such as from 0.86 g/cm$^3$ to 0.88 g/cm$^3$. Mineral oil can have a kinematic viscosity at 40° C. of from 70 cSt to 240 cSt according to ASTM D445, such as from 160 cSt to 190 cSt, such as about 170 cSt. Mineral oil can have an average molecular weight of from 400 g/mol to 600 g/mol according to ASTM D2502, such as from 450 g/mol to 550 g/mol, such as about 500 g/mol. In at least one embodiment, a mineral oil is HB380 from Sonneborn, LLC or HydroBrite 1000 white mineral oil.

The catalyst component slurry can then be combined in-line with the catalyst component solution to form a final catalyst composition. A nucleating agent 106, such as silica, alumina, fumed silica or any other particulate matter may be added to the slurry and/or the solution in-line or in the vessels 102 or 104. Similarly, additional activators or catalyst compounds may be added in-line. For example, a second catalyst slurry (catalyst component solution) that includes a different catalyst may be introduced from a second cat pot (which may include wax and mineral oil). The two catalyst slurries may be used as the catalyst system with or without the addition of a solution catalyst from the trim pot.

The catalyst component slurry and solution can be mixed in-line. For example, the solution and slurry may be mixed by utilizing a static mixer 108 or an agitating vessel. The mixing of the catalyst component slurry and the catalyst component solution should be long enough to allow the catalyst compound in the catalyst component solution to disperse in the catalyst component slurry such that the catalyst component, originally in the solution, migrates to the supported activator originally present in the slurry. The combination forms a uniform dispersion of catalyst compounds on the supported activator forming the catalyst composition. The length of time that the slurry and the solution are contacted is typically up to about 220 minutes, such as about 1 to about 60 minutes, about 5 to about 40 minutes, or about 10 to about 30 minutes.

In at least one embodiment, static mixer 108 of gas-phase reactor system 100 is maintained at an elevated temperature, such as from 30° C. to 75° C., such as from 40° C. to 45° C., for example about 43° C. or about 60° C. Elevated temperature can be obtained by electrically heat tracing static mixer 108 using, for example, a heating blanket. Maintaining static mixer 108 at an elevated temperature can provide reduced or eliminated foaming in static mixer 108 and can promote mixing of the catalyst component slurry and catalyst solution (as compared to lower temperatures) which reduces run times in the static mixer and for the overall polymerization process.

When combining the catalysts, the activator and the optional support or additional co-catalysts in the hydrocarbon solvents immediately prior to a polymerization reactor, the combination can yield a new polymerization catalyst in less than 1 h, less than 30 min, or less than 15 min Shorter times are more effective, as the new catalyst is ready before being introduced into the reactor, which can provide faster flow rates.

In another embodiment, an aluminum alkyl, an ethoxylated aluminum alkyl, an aluminoxane, an anti-static agent or a borate activator, such as a $C_1$ to $C_{15}$ alkyl aluminum (for example tri-isobutyl aluminum, trimethyl aluminum or the like), a $C_1$ to $C_{15}$ ethoxylated alkyl aluminum or methyl aluminoxane, ethyl aluminoxane, isobutylaluminoxane, modified aluminoxane or the like are added to the mixture of the slurry and the solution in line. The alkyls, antistatic agents, borate activators and/or aluminoxanes may be added from an alkyl vessel 110 directly to the combination of the solution and the slurry, or may be added via an additional alkane (such as hexane, heptane, and or octane) carrier stream, for example, from a carrier vessel 112. The additional alkyls, antistatic agents, borate activators and/or aluminoxanes may be present at up to 500 ppm, at 1 ppm to 300 ppm, at 10 ppm to 300 ppm, or at 10 ppm to 100 ppm. A carrier gas 114 such as nitrogen, argon, ethane, propane, and the like, may be added in-line to the mixture of the slurry and the solution. Typically the carrier gas may be added at the rate of about 1 to about 100 lb/hr (0.4 to 45 kg/hr), or about 1 to about 50 lb/hr (5 to 23 kg/hr), or about 1 to about 25 lb/hr (0.4 to 11 kg/hr).

In such embodiments, a molar ratio of first catalyst to second catalyst, or the molar ratio of second catalyst to first catalyst, (before or after trimming the catalyst system) can be from about 1:99 to 99:1, such as from 90:10 to 10:90, such as from 85:15 to 50:50, such as from 80:20 to 50:50, such as from 75:25 to 50:50, such as from 60:40 to 40:60. In such embodiments, a molar ratio of the first catalyst to a third catalyst of the catalyst system, or a molar ratio of a third catalyst to a first catalyst of the catalyst system, is from 99:1 to 1:99, such as from 90:10 to 10:90, such as from 85:15 to 50:50, such as from 80:20 to 50:50, such as from 75:25 to 50:50, such as from 60:40 to 40:60.

In at least one embodiment, a liquid carrier stream is introduced into the combination of the solution and slurry. The mixture of the solution, the slurry and the liquid carrier stream may pass through a mixer or length of tube for mixing before being contacted with a gaseous carrier stream. Similarly, a comonomer 116, such as hexene, another alpha-olefin, or diolefin, may be added in-line to the mixture of the slurry and the solution.

In at least one embodiment, a gas stream 126, such as cycle gas, or re-cycle gas 124, monomer, nitrogen, or other materials is introduced into an injection nozzle 300 having a support tube 128 that surrounds an injection tube 120. The slurry/solution mixture is passed through the injection tube 120 to a reactor 122. In at least one embodiment, the injection tube may aerosolize the slurry/solution mixture. Any number of suitable tubing sizes and configurations may be used to aerosolize and/or inject the slurry/solution mixture.

Figure 2:
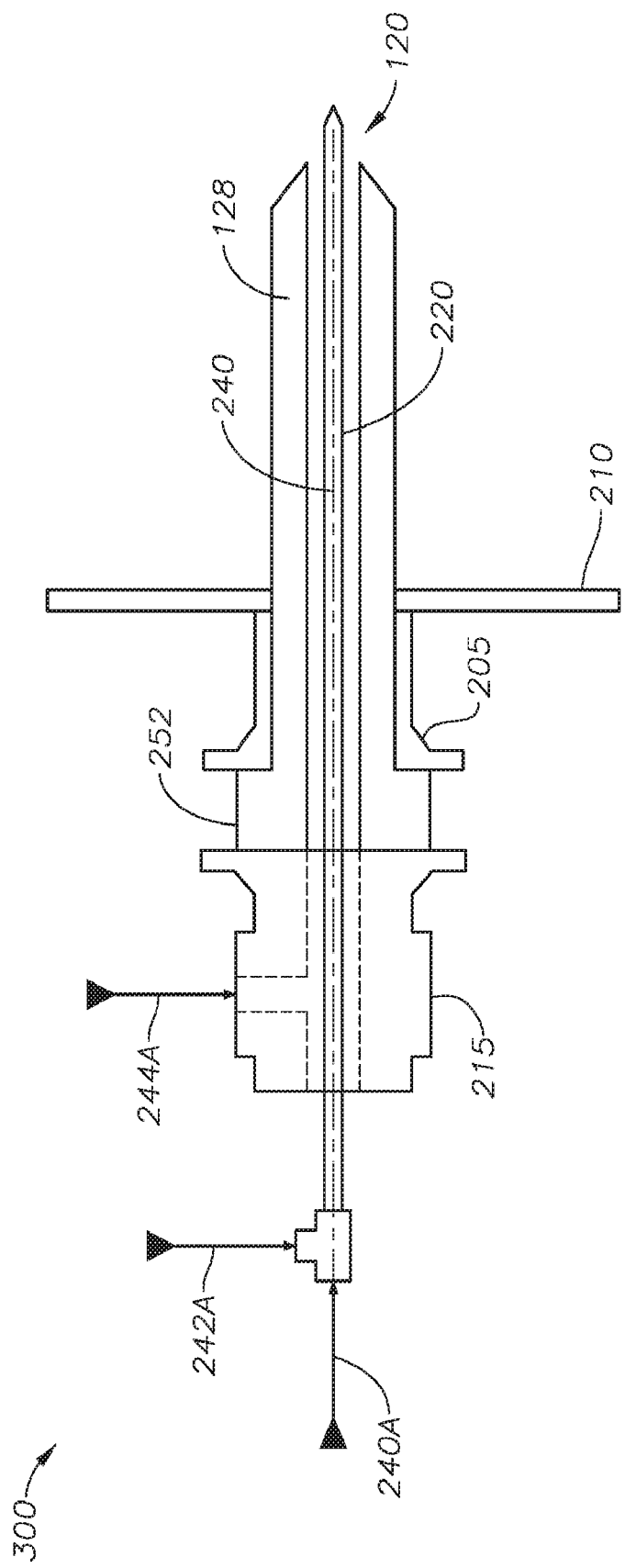
FIG. 2 is a schematic of a nozzle, according to one embodiment.

In at least one embodiment, nozzle 300 is an "effervescent" nozzle. It has been discovered that use of an effervescent nozzle can provide a 3-fold increase or more in nozzle efficiency of a trim process as compared to conventional trim process nozzles. FIG. 2 is a schematic diagram of one embodiment of nozzle 300. As shown in FIG. 2, injection nozzle 300 is in fluid communication with one or more feed lines (three are shown in FIG. 2) 240A, 242A, 244A. Each feed line 240A, 242A, 244A provides an independent flow path for one or more monomers, purge gases, catalyst and/or catalyst systems to any one or more of the conduits 220 and 240. Feed line 242A provides the feed provided by piping 140 (shown in FIG. 1), and feed lines 240A and 244A independently provide feeds from piping of a similar or same apparatus, such as the trim feed apparatus of FIG. 1. Alternatively, feed lines 240A, 242A, and 244A independently provide catalyst slurry, catalyst component solution, liquid carrier stream, monomer, or comonomer.

Feed line ("first feed line") 240A can be in fluid communication with an annulus defined by the inner surface of the first conduit 220 and the outer surface of the second conduit 240. In one or more embodiments, a feed line ("second feed line") 242A provides the feed provided by piping 140 (shown in FIG. 1) and can be in fluid communication with an annulus within the second conduit 240. A feed line ("third feed line") 244A can be in fluid communication with an annulus defined by the inner surface of the support member 128 and the outer surface of the first conduit 220.

Any of the one or more catalyst or catalyst systems, purge gases, and monomers can be injected into any of the one or more feed lines 240A, 242A, 244A. The one or more catalyst or catalyst systems can be injected into the first conduit 220 using the first feed line 242A ("catalyst feed line"). The one or more purge gases or inert gases can be injected into the second conduit 240 using the second feed line 240A ("purge gas feed line"). The one or more monomers can be injected into the support member 128 using the third feed line 244A ("monomer feed line"). The feed lines 240A, 242A, 244A can be any conduit capable of transporting a fluid therein. Suitable conduits can include tubing, flex hose, and pipe. A three way valve 215 can be used to introduce and control the flow of the fluids (i.e. catalyst slurry, purge gas and monomer) to the injection nozzle 300. Any suitable commercially available three way valve can be used.

Support member 128 can include a first end having a flanged section 252. The support member 128 can also include a second end that is open to allow a fluid to flow there through. In one or more embodiments, support member 128 is secured to a reactor wall 210. In one or more embodiments, flanged section 252 can be adapted to mate or abut up against a flanged portion 205 of the reactor wall 210 as shown.

In one or more embodiments, at least a portion of the support tube 128 has a tapered outer diameter. The second end ("open end") of support tube 128 can be tapered to reduce the wall thickness at the tip of the support tube 128. Minimizing the area at the tip of support tube 128 helps prevent fouling. Fouling can be caused due to agglomerate formation of polymer on a nozzle, a concept referred to as "pineappling". A suitable effervescent nozzle for at least one embodiment of the present disclosure is shown in U.S. Patent Pub. No. 2010/0041841 A1, which is incorporated herein by reference in its entirety.

As shown in FIG. 2, support member 128 is a tubular or annular member. Support member 128 can have an inner diameter large enough to surround first conduit 220. The monomer flow, such as through feed line 244A and or through support tube 128, can be from 50 kg/hr to 1,150 kg/hr, such as from 100 kg/hr to 950 kg/hr, such as from 100 kg/hr to 500 kg/hr, such as from 100 kg/hr to 300 kg/hr, such as from 180 kg/hr to 270 kg/hr, such as from 150 kg/hr to 250 kg/hr, for example about 180 kg/hr. These flow rates can be achieved by a support tube, such as support tube 128, having a diameter of from ¼ inch to ¾ inch, for example about ½ inch. A diameter of from ¼ inch to ¾ inch has been discovered to provide reduced flow rates as compared to conventional trim process flow rates (e.g., 1,200 kg/hr), which further provides reduced overall amounts of liquid carrier (such as $iC_5$) and nitrogen used during a polymerization process.

An effervescent nozzle as described herein can further provide control of slurry droplet size into a reactor as a function of gas velocity and not liquid velocity, which allows a desired droplet size to be achieved by adjusting, for example, the carrier gas flow rate (e.g., 114 of FIG. 1) while allowing a range of carrier fluid (e.g., 112 of FIG. 1) to be utilized during a polymerization process. For example, in at least one embodiment, methods of the present disclosure can provide a ratio of supported catalyst particles per droplet of carrier fluid of from 1:1 to 10:1, such as 5:1, which can provide reduced overall amounts of liquid carrier (such as $iC_5$) used during a trim polymerization process, as compared to a conventional trim catalyst particle to droplet ratio of 1:1. In at least one embodiment, a carrier gas flow rate is from 1 kg/hr to 50 kg/hr, such as from 1 kg/hr to 25 kg/hr, such as from 2 kg/hr to 20 kg/hr, such as from 2.5 kg/hr to 15 kg/hr. In at least one embodiment, a carrier fluid flow rate is from 1 kg/hr to 100 kg/hr, such as from 5 kg/hr to 50 kg/hr, such as from 5 kg/hr to 30 kg/hr, such as from 10 kg/hr to 25 kg/hr, for example about 15 kg/hr.

In at least one embodiment, a plurality of effervescent nozzles (not shown) is coupled with a reactor. For example, two or more effervescent nozzles are coupled with a reactor, and the flow rate of slurry from each nozzle is less than if only one effervescent nozzle were coupled with the reactor. In one embodiment, a flow rate of slurry from two effervescent nozzles is about 11 kg/hr from each of the nozzles. An additional nozzle (e.g., a third nozzle) can also be coupled with the reactor and can remain inactive (e.g., offline) until one of the first two nozzles becomes inactive. In one embodiment, each effervescent nozzle (e.g., all three nozzles) is active (e.g., online) during a polymerization process. Each component (e.g., catalyst slurry from one cat pot 102) can be fed to the nozzles using a catalyst flow splitter. A suitable catalyst flow splitter is described in U.S. Pat. No. 7,980,264, which is incorporated herein by reference in its entirety.

Returning to FIG. 1, to promote formation of particles in the reactor 122, a nucleating agent 118, such as fumed silica, can be added directly into the reactor 122. Conventional trim polymerization processes involve a nucleating agent introduced into a polymerization reactor. However, processes of the present disclosure have provided advantages such that addition of a nucleating agent (such as spray dried fumed silica) to the reactor is merely optional. For embodiments of processes of the present disclosure that do not include a nucleating agent, it has been discovered that a high polymer bulk density (e.g., 0.4 g/cm$^3$ or greater) can be obtained, which is greater than the bulk density of polymers formed by conventional trim processes. Furthermore, when a metallocene catalyst or other similar catalyst is used in the gas phase reactor, oxygen or fluorobenzene can be added to the reactor 122 directly or to the gas stream 126 to control the polymerization rate. Thus, when a metallocene catalyst (which is sensitive to oxygen or fluorobenzene) is used in combination with another catalyst (that is not sensitive to oxygen) in a gas phase reactor, oxygen can be used to modify the metallocene polymerization rate relative to the polymerization rate of the other catalyst. An example of such a catalyst combination is bis(n-propylcyclopentadienyl) zirconium dichloride and [(2,4,6-Me$_3$C$_6$H$_2$)NHCH$_2$CH$_2$]$_2$NHZrBn$_2$, where Me is methyl or bis(indenyl)zirconium dichloride and [(2,4,6-Me$_3$C$_6$H$_2$)NHCH$_2$CH$_2$]$_2$NHHfBn$_2$, where Me is methyl. For example, if the oxygen concentration in the nitrogen feed is altered from 0.1 ppm to 0.5 ppm, significantly less polymer from the bisindenyl ZrCl$_2$ will be produced and the relative amount of polymer produced from the [(2,4,6-Me$_3$C$_6$H$_2$)NHCH$_2$CH$_2$]$_2$NHHfBn$_2$ is increased. WO 1996/009328 discloses the addition of water or carbon dioxide to gas phase polymerization reactors, for example, for similar purposes. In one embodiment, the contact temperature of the slurry and the solution is in the range of from 0° C. to about 80° C., from about 0° C. to about 60° C., from about 10° C., to about 50° C., and from about 20° C. to about 40° C.

The example above is not limiting, as additional solutions and slurries may be included. For example, a slurry can be combined with two or more solutions having the same or different catalyst compounds and or activators. Likewise, the solution may be combined with two or more slurries each having the same or different supports, and the same or different catalyst compounds and or activators. Similarly, two or more slurries combined with two or more solutions, for example in-line, where the slurries each comprise the same or different supports and may comprise the same or different catalyst compounds and or activators and the solutions comprise the same or different catalyst compounds and or activators. For example, the slurry may contain a supported activator and two different catalyst compounds, and two solutions, each containing one of the catalysts in the slurry, and each are independently combined, in-line, with the slurry.

Use of Catalyst Composition to Control Product Properties

The properties of the product polymer may be controlled by adjusting the timing, temperature, concentrations, and sequence of the mixing of the solution, the slurry and any optional added materials (nucleating agents, catalyst compounds, activators, etc.) described above. The MWD, MI, density, MIR, relative amount of polymer produced by each catalyst, and other properties of the polymer produced may also be changed by manipulating process parameters. Any number of process parameters may be adjusted, including manipulating hydrogen concentration in the polymerization system, changing the amount of the first catalyst in the polymerization system, changing the amount of the second catalyst in the polymerization system, or changing the amount of the third catalyst in the polymerization system. Other process parameters that can be adjusted include changing the relative ratio of the catalysts in the polymerization process (and optionally adjusting their individual feed rates to maintain a steady or constant polymer production rate). The concentrations of reactants in the reactor 122 can be adjusted by changing the amount of liquid or gas that is withdrawn or purged from the process, changing the amount and/or composition of a recovered liquid and/or recovered gas returned to the polymerization process, wherein the recovered liquid or recovered gas can be recovered from polymer discharged from the polymerization process. Further process parameters including concentration parameters that can be adjusted include changing the polymerization temperature, changing the ethylene partial pressure in the polymerization process, changing the ethylene to comonomer ratio in the polymerization process, changing the activator to transition metal ratio in the activation sequence. Time dependent parameters may be adjusted such as changing the relative feed rates of the slurry or solution, changing the mixing time, the temperature and or degree of mixing of the slurry and the solution in-line, adding different types of activator compounds to the polymerization process, and or adding oxygen or fluorobenzene or other catalyst poison to the polymerization process. Any combinations of these adjustments may be used to control the properties of the final polymer product.

In at least one embodiment, the MWD of the polymer product is measured at regular intervals and one of the above process parameters, such as temperature, catalyst compound feed rate, the ratios of the two or more catalysts to each other, the ratio of comonomer to monomer, the monomer partial pressure, and or hydrogen concentration, is altered to bring the composition to the desired level, if necessary. The MWD may be measured by size exclusion chromatography (SEC), e.g., gel permeation chromatography (GPC), among other techniques.

In at least one embodiment, a polymer product property is measured in-line and in response the ratio of the catalysts being combined is altered. In at least one embodiment, the molar ratio of the catalyst compound in the catalyst component slurry to the catalyst compound in the catalyst component solution, after the slurry and solution have been mixed to form the final catalyst composition, is 500:1 to 1:500, or 100:1 to 1:100, or 50:1 to 1:50 or 40:1 to 1:10. The product property measured can include the dynamic shear viscosity, flow index, melt index, density, MWD, comonomer content, and combinations thereof. In another embodiment, when the ratio of the catalyst compounds is altered, the introduction rate of the catalyst composition to the reactor, or other process parameters, is altered to maintain a desired production rate.

Polymerization Process

The catalyst system can be used to polymerize one or more olefins to provide one or more polymer products therefrom. Any suitable polymerization process can be used, including, but not limited to, high pressure, solution, slurry, and/or gas phase polymerization processes. In embodiments that use other techniques besides gas phase polymerization, modifications to a catalyst addition system that are similar to those discussed with respect to FIG. 1 and/or FIG. 2 can be used. For example, a trim system may be used to feed catalyst to a loop slurry reactor for polyethylene copolymer production.

In some embodiments, a method for producing a polyolefin includes contacting a first composition and a second composition in a line to form a third composition, wherein: the first composition comprises a contact product of a first catalyst, a second catalyst, a support, a first activator, and a diluent, wherein the mol ratio of second catalyst to first catalyst is from 60:40 to 40:60, the second composition comprises a contact product of the third catalyst, a second activator, and a second diluent, and the third composition comprises a mol ratio of the third catalyst to the second catalyst to the first catalyst of from 10:35:55 to 60:15:25, such as 30:20:30; introducing the third composition from the line into a gas-phase fluidized bed reactor; exposing the third composition to polymerization conditions; and obtaining a polyolefin.

In some embodiments, a method for producing a polyolefin includes: contacting a first composition and a second composition in a line to form a third composition, wherein: the first composition comprises a contact product of a first catalyst, a second catalyst, a support, a first activator, and a diluent, wherein the mol ratio of second catalyst to first catalyst is from 60:40 to 40:60, the second composition comprises a contact product of the second catalyst, a second activator, and a second diluent, and the third composition comprises a mol ratio of the second catalyst to the first catalyst of from 60:40 to 90:10; introducing the third composition from the line into a gas-phase fluidized bed reactor; exposing the third composition to polymerization conditions; contacting the third composition and a fourth composition in the line to form a fifth composition, wherein: the fourth composition comprises a contact product of a third catalyst, a third activator, and a third diluent, and the fifth composition comprises a mol ratio of the third catalyst to the first catalyst of from 2:1 to 1:10; introducing the fifth composition from the line into the gas-phase fluidized bed reactor; exposing the fifth composition to polymerization conditions; and obtaining a polyolefin.

The terms "polyethylene" and "polyethylene copolymer" refer to a polymer having at least 50 wt % ethylene derived units. In various embodiments, the polyethylene can have at least 70 wt % ethylene-derived units, at least 80 wt % ethylene-derived units, at least 90 wt % ethylene-derived units, or at least 95 wt % ethylene-derived units. The polyethylene polymers described herein are generally copolymer, but may also include terpolymers, having one or more other monomeric units. As described herein, a polyethylene can include, for example, at least one or more other olefins or comonomers. Suitable comonomers can contain 3 to 16 carbon atoms, from 3 to 12 carbon atoms, from 4 to 10 carbon atoms, and from 4 to 8 carbon atoms. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

Referring again to FIG. 1, the fluidized bed reactor 122 can include a reaction zone 232 and a velocity reduction zone 134. The reaction zone 132 can include a bed 136 that includes growing polymer particles, formed polymer particles and a minor amount of catalyst particles fluidized by the continuous flow of the gaseous monomer and diluent to remove heat of polymerization through the reaction zone. Optionally, some of the re-circulated gases 124 can be cooled and compressed to form liquids that increase the heat removal capacity of the circulating gas stream when readmitted to the reaction zone. A suitable rate of gas flow can be readily determined by experimentation. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone 132 can be passed to the velocity reduction zone 134 where entrained particles are removed, for example, by slowing and falling back to the reaction zone 132. If desired, finer entrained particles and dust can be removed in a separation system 138. Such as a cyclone and/or fines filter. The gas 124 can be passed through a heat exchanger 144 where at least a portion of the heat of polymerization can be removed. The gas can then be compressed in a compressor 242 and returned to the reaction zone 132. Additional reactor details and means for operating the reactor 122 are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluid bed process can be greater than 30° C., such as greater than 40° C., such as greater than 50° C., such as greater than 90° C., such as greater than 100° C., such as greater than 110° C., such as greater than 120° C., such as greater than 150° C., or higher. In general, the reactor temperature is operated at a suitable temperature taking into account the sintering temperature of the polymer product within the reactor. Thus, the upper temperature limit in at least one embodiment is the melting temperature of the polyethylene copolymer produced in the reactor. However, higher temperatures may result in narrower MWDs, which can be improved by the addition of a catalyst, or other co-catalysts, as described herein.

Hydrogen gas can be used in olefin polymerization to control the final properties of the polyolefin, such as described in the "Polypropylene Handbook", at pages 76-78 (Hanser Publishers, 1996). Using certain catalyst systems, increasing concentrations (partial pressures) of hydrogen can increase a flow index such as MI of the polyethylene copolymer generated. The MI can thus be influenced by the hydrogen concentration. The amount of hydrogen in the polymerization can be expressed as a mole ratio relative to the total polymerizable monomer, for example, ethylene, or a blend of ethylene and hexene or propylene.

The amount of hydrogen used in the polymerization process can be an amount necessary to achieve the desired MI of the final polyolefin polymer. For example, the mole ratio of hydrogen to total monomer ($H_2$:monomer) can be 0.0001 or greater, 0.0005 or greater, or 0.001 or greater. Further, the mole ratio of hydrogen to total monomer ($H_2$:monomer) can be 10 or less, 5 or less, 3 or less, or 0.10 or less. A range for the mole ratio of hydrogen to monomer can include any combination of any upper mole ratio limit with any lower mole ratio limit described herein. The amount of hydrogen in the reactor at any time can range to up to 5,000 ppm, up to 4,000 ppm in another embodiment, up to 3,000 ppm, or from 50 ppm to 5,000 ppm, or from 50 ppm to 2,000 ppm in another embodiment. The amount of hydrogen in the reactor can range from 1 ppm, 50 ppm, or 100 ppm to 400 ppm, 800 ppm, 1,000 ppm, 1,500 ppm, or 2,000 ppm, based on weight. Further, the ratio of hydrogen to total monomer ($H_2$:monomer) can be 0.00001:1 to 2:1, 0.005:1 to 1.5:1, or 0.0001:1 to 1:1. The one or more reactor pressures in a gas phase process (either single stage or two or more stages) can vary from 690 kPa (100 psig) to 3,448 kPa (500 psig), in the range from 1,379 kPa (200 psig) to 2,759 kPa (400 psig), or in the range from 1,724 kPa (250 psig) to 2,414 kPa (350 psig).

The gas phase reactor can be capable of producing from 10 kg of polymer per hour (25 lbs/hr) to 90,900 kg/hr (200,000 lbs/hr), or greater, and greater than 455 kg/hr (1,000 lbs/hr), greater than 4.540 kg/hr (10,000 lbs/hr), greater than 11,300 kg/hr (25.000 lbs/hr), greater than 15,900 kg/hr (35,000 lbs/hr), and greater than 22,700 kg/hr (50,000 lbs/hr), and from 29,000 kg/hr (65,000 lbs/hr) to 45,500 kg/hr (100,000 lbs/hr).

As noted, a slurry polymerization process can also be used in embodiments. A slurry polymerization process generally uses pressures in the range of from 101 kPa (1 atmosphere) to 5,070 kPa (50 atmospheres) or greater, and temperatures from 0° C. to 120° C., and more particularly from 30° C. to 100° C. In a slurry polymerization, a suspension of solid, particulate polymer can be formed in a liquid polymerization diluent medium to which ethylene, comonomers, and hydrogen along with catalyst can be added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium is used the process should be operated above the reaction diluent critical temperature and pressure. In at least one embodiment, a hexane, isopentane $iC_5$, or isobutane $iC_4$ medium can be employed. The slurry can be circulated in a continuous loop system.

A number of tests can be used to compare resins from different sources, catalyst systems, and manufacturers. Such tests can include melt index, high load melt index, melt index ratio, density, die swell, environmental stress crack resistance, among others.

In embodiments herein, the present disclosure provides polymerization processes where monomer (such as propylene or ethylene), and optionally comonomer, are contacted with a catalyst system comprising an activator and at least one catalyst compound, as described above. The catalyst compound and activator may be combined in any order, and are combined typically prior to contacting with the monomer.

In at least one embodiment, a polymerization process includes a) contacting one or more olefin monomers with a catalyst system comprising: i) an activator and ii) a catalyst compound of the present disclosure. The activator is a non-coordination anion activator. The one or more olefin monomers may be propylene and/or ethylene and the polymerization process further comprises heating the one or more olefin monomers and the catalyst system to 70° C. or more to form propylene polymers or ethylene polymers, such as propylene polymers.

Monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer comprises propylene and one or more optional comonomers selected from propylene or $C_4$ to $C_{40}$ olefins, such as $C_4$ to $C_{20}$ olefins, such as $C_4$ to $C_{12}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer comprises propylene and an optional comonomer that is one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein (in other words, the polymer has diene residues) at up to 10 wt %, such as at 0.00001 to 1.0 wt %, such as 0.002 to 0.5 wt %, such as 0.003 to 0.2 wt %, based upon the total weight of the composition. In at least one embodiment 500 ppm or less of diene is added to the polymerization, such as 400 ppm or less, such as 300 ppm or less. In other embodiments at least 50 ppm of diene is added to the polymerization, or 100 ppm or more, or 150 ppm or more.

Diene monomers include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diene monomers can be selected from alpha, omega-diene monomers (i.e. di-vinyl monomers). The diolefin monomers are linear di-vinyl monomers, such as those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

In at least one embodiment, a catalyst of the present disclosure is capable of producing ethylene polymers having an Mw from 40,000 g/mol to 1,500,000 g/mol, such as from 70,000 g/mol to 1,000,000 g/mol, such as from 90,000 g/mol to 1,000,000 g/mol, such as from 100,000 g/mol to 600,000 g/mol, such as from 100,000 g/mol to 300,000 g/mol, such as from 100,000 g/mol to 200,000 g/mol.

In at least one embodiment, a catalyst of the present disclosure is capable of producing ethylene polymers having a melt index (MI) of 0.6 or greater g/10 min, such as 0.7 or greater g/10 min, such as 0.8 or greater g/10 min, such as 0.9 or greater g/10 min, such as 1.0 or greater g/10 min, such as 1.1 or greater g/10 min, such as 1.2 or greater g/10 min "Catalyst productivity" is a measure of how many grams of polymer (P) are produced using a polymerization catalyst comprising W g of catalyst (cat), over a period of time of T hours; and may be expressed by the following formula: $P/(T \times W)$ and expressed in units of $gPgcat^{-1} hr^{-1}$. In at least one embodiment, the productivity of the catalyst system of a polymerization of the present disclosure is at least 50 g(polymer)/g(cat)/hour, such as 500 or more g(polymer)/g(cat)/hour, such as 800 or more g(polymer)/g(cat)/hour, such as 5,000 or more g(polymer)/g(cat)/hour, such as 6,000 or more g(polymer)/g(cat)/hour.

Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof.

The Product Polyolefin

In some embodiments, the polyolefin is a polyethylene. The product polyethylene can have one or more of the following properties:

1) A melt index ratio (MIR, $I_{21}/I_2$) ranging from 10 to less than 300, or, in many embodiments, from about 15 to about 150, such as from about 20 to about 100, for example between about 10 and 80 or between about 50 and about 80. The MIR can be determined according to D1238 (190° C., 2.16 kg load).

2) A high load melt index (HLMI) ranging from 30 g/10 min to 80 g/10 min, as determined by ASTM D1238 (190° C., 2.16 kg load).

3) A density ranging from 0.89 g/cm³, 0.90 g/cm³, or 0.91 g/cm³ to 0.95 g/cm³, 0.96 g/cm³, or 0.97 g/cm³. For example, the density can be from about 0.913 g/cm³ to about 0.940 g/cm³. Density can be determined in accordance with ASTM D792. Density is expressed as grams per cubic centimeter (g/cm³) unless otherwise noted.

4) A bulk density of from 0.25 g/cm³ to 0.5 g/cm³. For example, the bulk density of the polyethylene can range from 0.30 g/cm³, 0.32 g/cm³, or 0.33 g/cm³ to 0.40 g/cm³, 0.44 g/cm³, or 0.48 g/cm³. The bulk density can be measured in accordance with ASTM D1895 method B.

5) Bimodal or multimodal.

In some embodiments, a mol ratio of the second catalyst to the first catalyst, and/or a mol ratio of the third catalyst to the first catalyst is selected to produce a polyolefin having one or more of the aforementioned properties.

End Uses

The multi-modal polyolefin produced by the processes disclosed herein and blends thereof are useful in such forming operations as film, sheet, and fiber extrusion and co-extrusion as well as blow molding, injection molding, and rotary molding Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Specifically, any of the foregoing polymers, such as the foregoing ethylene copolymers or blends thereof, may be used in mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

Blends

The polymers produced herein may be further blended with additional ethylene polymers (referred to as "second ethylene polymers" or "second ethylene copolymers") and use in film, molded part and other typical polyethylene applications.

In one aspect of the present disclosure, the second ethylene polymer is selected from ethylene homopolymer, ethylene copolymers, and blends thereof. Useful second ethylene copolymers can comprise one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In at least one embodiment, the second ethylene polymers are made by the catalysts, activators and processes described in U.S. Pat. Nos. 6,342,566; 6,384,142; 5,741,563; PCT publications WO 03/040201; and WO 97/19991. Such catalysts are well known in the art, and are described in, for example, ZIEGLER CATALYSTS (Gerhard Fink, Rolf Müllhaupt and Hans H. Brintzinger, eds., Springer-Verlag 1995); Resconi et al.; and I, II METALLOCENE-BASED POLYOLEFINS (Wiley & Sons 2000).

Additional Aspects

The present disclosure provides, among others, the following aspects, each of which may be considered as optionally including any alternate aspects.

Clause 1. A method for producing a polyolefin comprising:
  contacting a first composition and a second composition in a line to form a third composition, wherein:
    the first composition comprises a contact product of a first catalyst, a second catalyst, a support, a first activator, and a diluent, wherein the mol ratio of second catalyst to first catalyst is from 60:40 to 40:60,
    the second composition comprises a contact product of a third catalyst, a second activator, and a second diluent, and
    the third composition comprises a mol ratio of third catalyst to second catalyst to first catalyst of from 10:35:55 to 60:15:25;
    introducing the third composition from the line into a gas-phase fluidized bed reactor; exposing the third composition to polymerization conditions; and obtaining a polyolefin.

Clause 2. The method of Clause 1, wherein the first catalyst is a metallocene catalyst and the second catalyst is a metallocene catalyst.

Clause 3. The method of Clauses 1 or 2, wherein the third catalyst is a metallocene catalyst.

Clause 4. The method of any of Clauses 1 to 3, wherein the first composition further comprises a wax.

Clause 5. The method of any of Clauses 1 to 4, wherein a mol ratio of the second catalyst to the first catalyst is selected to produce the polyolefin having a density of from 0.913 g/cm$^3$ to 0.940 g/cm$^3$.

Clause 6. The method of any of Clauses 1 to 5, wherein a mol ratio of the second catalyst to the first catalyst is selected to produce the polyolefin having:
  an MIR of from 10 to about 80, as determined by ASTM D1238 (190° C., 2.16 kg load); and
  a density of from 0.913 g/cm$^3$ to 0.940 g/cm$^3$.

Clause 7. The method of any of Clauses 1 to 6, wherein a mol ratio of the second catalyst to the first catalyst is selected to produce the polyolefin having an HLMI of from 30 g/10 min to 80 g/10 min, as determined by ASTM D1238 (190° C., 2.16 kg load).

Clause 8. The method of Clauses 1 to 7, wherein a mol ratio of the third catalyst to the first catalyst is selected to produce the polyolefin having a density of from 0.913 g/cm$^3$ to 0.940 g/c m$^3$.

Clause 9. The method of any of Clauses 1 to 8, wherein a mol ratio of the third catalyst to the first catalyst is selected to produce the polyolefin having:
  an MIR of from 10 to about 80, as determined by ASTM D1238 (190° C., 2.16 kg load); and
  a density of from 0.913 g/cm$^3$ to 0.940 g/cm$^3$.

Clause 10. The method of any of Clauses 1 to 9, wherein a mol ratio of the third catalyst to the first catalyst is selected to produce the polyolefin having an HLMI of from 30 g/10 min to 80 g/10 min, as determined by ASTM D1238 (190° C., 2.16 kg load).

Clause 11. The method of any of Clauses 1 to 10, wherein the polyolefin comprises a copolymer of ethylene and a $C_4$ to $C_{12}$ alpha olefin comonomer.

Clause 12. The method of Clause 11, wherein the alpha olefin comonomer is hexene.

Clause 13. The method of any of Clauses 1 to 12, wherein the first catalyst promotes polymerization of ethylene into a low molecular weight portion of the polyolefin, and wherein the second catalyst promotes polymerization of ethylene into a high molecular weight portion of the polyolefin.

Clause 14. The method of any of Clauses 1 to 13, wherein the third catalyst promotes polymerization of ethylene into a high molecular weight portion of the polyolefin.

Clause 15. The method of any of Clauses 1 to 14, wherein the first catalyst is di(1-ethylindenyl) zirconium dimethyl.

Clause 16. The method of any of Clauses 1 to 15, wherein the second catalyst is bis(n-propylcyclopentadienyl) hafnium (IV) dimethyl.

Clause 17. The method of any of Clauses 1 to 16, wherein the third catalyst is dimethylsilyl-bis(trimethylsilylmethylenecyclopentadienyl)hafnium dimethyl.

Clause 18. The method of any of Clauses 1 to 17, wherein the diluent comprises a mineral oil.

Clause 19. The method of any of Clauses 1 to 18, wherein the mineral oil of the first composition and the second composition has a density of from 0.85 g/cm$^3$ to 0.9 g/cm$^3$ at 25° C. according to ASTM D4052, a kinematic viscosity at 25° C. of from 150 cSt to 200 cSt according to ASTM D341, and an average molecular weight of from 400 g/mol to 600 g/mol according to ASTM D2502.

Clause 20. The method of any of Clauses 1 to 19, wherein the diluent comprises iC$_4$, nC$_4$, iC$_5$, or iC$_6$.

Clause 21. The method of any of Clauses 4 to 22, wherein the wax is a paraffin wax and the first composition comprises 10 wt % or greater of the paraffin wax.

Clause 22. The method of Clause 21, wherein the first composition comprises 40 wt % or greater of the paraffin wax.

Clause 23. The method of any of Clauses 1 to 22, wherein the second composition is free of a support.

Clause 24. A method for producing a polyolefin comprising:
contacting a first composition and a second composition in a line to form a third composition, wherein:
the first composition comprises a contact product of a first catalyst, a second catalyst, a support, a first activator, and a diluent, wherein the mol ratio of second catalyst to first catalyst is from 60:40 to 40:60,
the second composition comprises a contact product of the second catalyst, a second activator, and a second diluent, and
the third composition comprises a mol ratio of second catalyst to first catalyst of from 60:40 to 90:10;
introducing the third composition from the line into a gas-phase fluidized bed reactor;
exposing the third composition to polymerization conditions;
contacting the third composition and a fourth composition in the line to form a fifth composition, wherein:
the fourth composition comprises a contact product of a third catalyst, a third activator, and a third diluent, and
the fifth composition comprises a mol ratio of third catalyst to first catalyst of from 2:1 to 1:10;
introducing the fifth composition from the line into the gas-phase fluidized bed reactor;
exposing the fifth composition to polymerization conditions; and
obtaining a polyolefin.

Clause 25. The method of Clause 24, wherein each of the first catalyst, the second catalyst, and the third catalyst is a metallocene catalyst.

Experimental

Trim Composition: HB380 Mineral Oil

HB380 Mineral oil and iC$_5$ are two possible trim media. iC$_5$ trim is a low viscosity trim and when combined with the slurry solution can cause catalyst settling and static mixer plugging. A higher viscosity HB380 mineral oil trim can be used instead of iC$_5$.

Both low viscosity hydrocarbon (iC$_5$/iC$_6$) and higher viscosity HB380 mineral oil result in good trim efficiency.

Catalyst Preparation

HfP:EtInd (60:40). To a stirred vessel is added of toluene (about 1400 g) and methylaluminoxane (30 wt % in toluene, about 925 g). To this solution is added about 734 g of ES70 silica (875° C. calcined). The mixture is stirred for about three hours at about 100° C. after which time the temperature was reduced and the reaction was allowed to cool to about room temperature. Bis-n-propylcyclopentadienide hafnium (IV) dimethyl (7.42 g, 18.00 mmol) and di(1-ethylindenyl) zirconium dimethyl (4.90 g, 12.00 mmol) are dissolved in toluene (250 g) and added to the vessel, which was stirred for about two hours. The mixing speed was then reduced and stirred slowly while drying under vacuum for about 60 hours, after which time, about 1055 g of light yellow silica was obtained.

Slurry Preparation

HB380 mineral oil and Sono Jell were each prepared by heating to about 100° C. while sparging with nitrogen for about 18 hours. The previously prepared HfP:EtInd (60:40) catalyst was added to portable container can along with equal weights of SonoJell and HB380 mineral oil to make a 20 wt % solids slurry. The can was then rolled for about 12 hours to mix the contents prior to use.

A commercial slurry preparation may be prepared according to the following procedure. In a temperature controlled agitated vessel, HB380 mineral oil and SonoJell are prepared by heating to a minimum of about 60° C. while sparging with nitrogen for a minimum of about 4 hours. The previously prepared catalyst is added to the liquid while maintaining a minimum of about 60° C. while agitator RPM is held constant. Headspace samples may be taken to verify extremely low levels of oxygen and water to meet specifications. This slurry is then discharged into shipping cylinders while maintaining a minimum of about 60° C. and agitator RPM held constant.

Process Summary

Polymerization was performed in an 18.5 foot (5.64 meters) tall gas-phase fluidized bed reactor with a 10 foot (3.05 meters) body and an 8.5 foot (2.6 meters) expanded section. Although the polymerization is discussed in terms of gas phase reactors, it may also be performed in other reactors, including slurry, solution, high-pressure, and any combination. Polymerizations may also be performed on lab scale and commercial scale reactors.

Cycle and feed gases are fed into the reactor body through a perforated distributor plate, and the reactor is controlled at about 300 psig and about 70 mol % ethylene. The reactor temperature is maintained at about 185° F. (85° C.) throughout the polymerization by controlling the temperature of the cycle gas loop.

Multiple catalysts (HfP:EtInd in a 60:40 ratio), co-supported on silica, were delivered to the reactor in a slurry mixture. In one mode of operation, the stirred catalyst slurry (60:40 HfP:EtInd in a liquid of 50:50 HB380:Sono Jell; 20 wt % solids) is pumped through a static mixer and then carried into the reactor by a larger volumetric flow of isopentane and N$_2$. Catalyst slurry and static mixer may be maintained at desired temperature by temperature control facilities (such as heat tracing or vessel jacket) on the agitated slurry vessel, piping and tubing, and static mixer. Desired temperature may range from about 20° C. to about 100° C. depending on specific viscosity and settling needs.

In another mode of operation, an unactivated metallocene catalyst in solution is co-fed to the static mixer with the catalyst slurry, where the trim catalyst supports onto the catalyst support and activates before being swept into the reactor by the iC$_5$ and N$_2$ carrier flows. The trim catalyst solution comprised of about 0.03 wt % to about 1.0 wt % metallocene catalyst in a hydrocarbon solvent (isopentane, isohexanes, or mineral oil). Catalyst slurry, trim, and static mixer may be maintained at desired temperature by temperature control facilities (such as heat tracing or vessel jacket) on the agitated slurry vessel, trim vessel, piping and tubing, and static mixer. Desired temperature may range from about 20° C. to about 100° C. depending on specific viscosity and settling needs.

For the Example Trim, the reactor is operated to steady state with a 60:40 HfP:EtInd co-supported catalyst. After the reactor was at steady state, a sample (Sample A1) was collected, and then the trim catalyst solution (about 0.1 wt % HfP in $iC_6$) flow was started and the MIR response was observed while reactor conditions were adjusted to maintain product properties. A series of reactor conditions were run while varying trim solution flow rates to adjust MIR. The trim catalyst was added so as to increase the ratio of HfP:EtInd to about 90:10 and a sample was collected (Sample A2). The trim catalyst solution was then exchanged for a trim catalyst solution of about 0.134 wt % Catalyst III in $iC_6$, and the flow was started, and the MIR response was observed while reactor conditions were adjusted to maintain product properties. Catalyst III is dimethylsilyl-bis(trimethylsilylmethylenecyclopentadienyl)hafnium dimethyl, or meso or rac enantiomers of that metallocene. A sample was collected (Sample A3). The concentration of Catalyst III chosen matched the metallocene molar flow rate of the previous HfP-based trim catalyst solution. The final catalyst ratio of HfP:EtInd:Catalyst III fed to the reactor was 47:16:37. A series of reactor conditions were run while varying trim solution flow rates to adjust MIR. The total time of trim solution and catalyst slurry in the feed lines between initial contact and the introduction of the $iC_5$ carrier is typically in the range of 15 to 60 minutes, with the ability to vary residence time as desired. Table 2 shows operating conditions and product properties for the Example Trim. The table illustrates that very different polymer properties can be obtained based on a starting catalyst ratio, whether the ratio increases or decreases, and that use of a second trim catalyst (e.g., Catalyst III) introduces an additional major component to the polymer.

Figure 3:
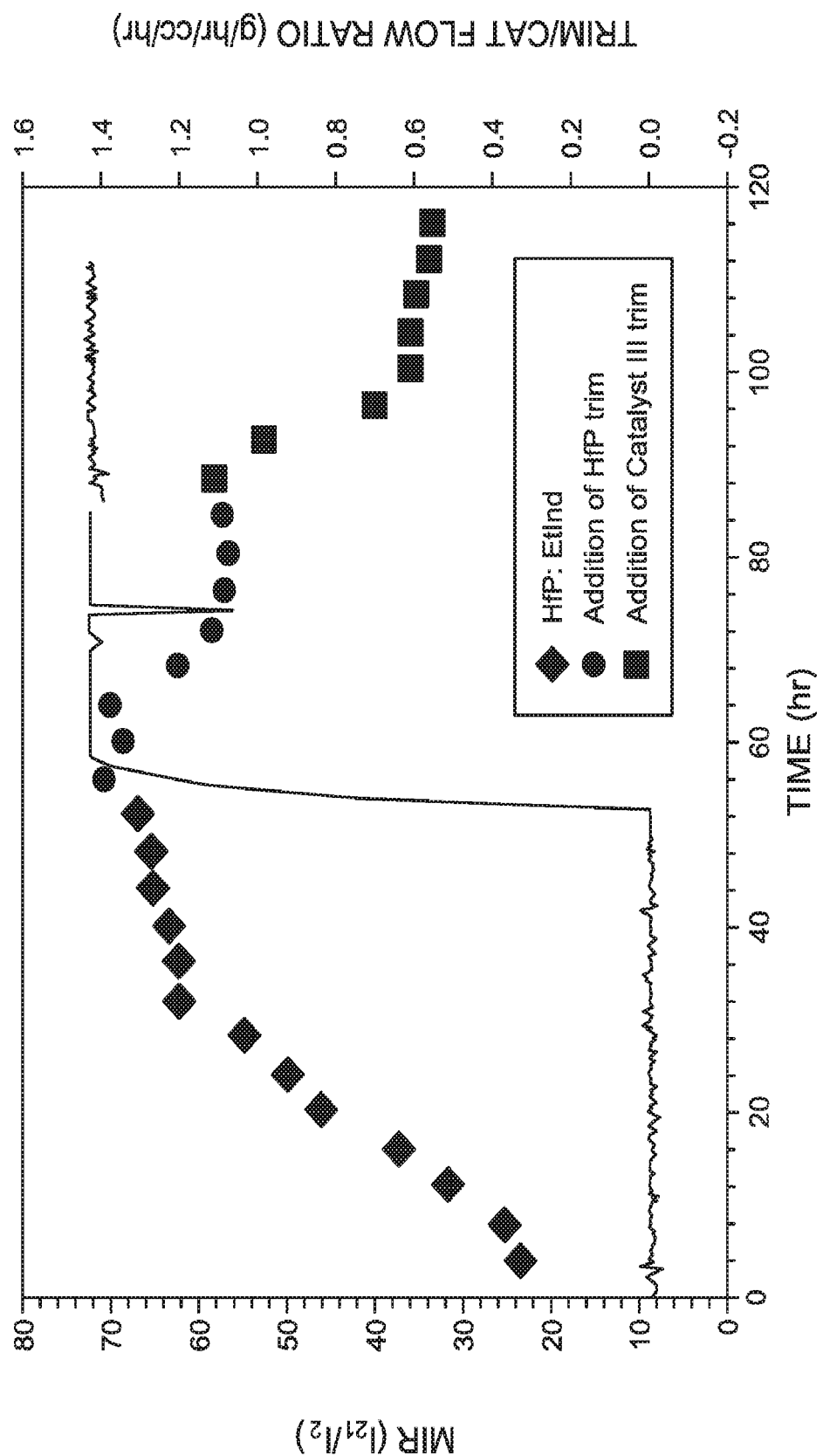
FIG. 3 is a plot of MIR ($I_{21}/I_2$) versus time for the transition from co-supported HfP:EtInd (60:40) with no trim, to addition of HfP trim, to addition of Catalyst III trim, in accordance with embodiments described herein.

FIG. 3 shows the trend of MIR versus time (hours). Following, and during, addition of the HfP trim catalyst, a decrease in MIR was observed over this period of time along with increased $H_2$ and decreased C6 to maintain similar overall MI and density, consistent with the addition of HfP. After and during addition of Catalyst III, a substantial decrease in MIR was observed over this period of time. There is a clear difference between the Trim/Cat ratio between the two "responses"/MIR decreases. The initial increase in MIR with no trim is due primarily to a transition from 90:10 to the 60:40 HfP:EtInd catalyst.

The Comparative Trim was run in a similar manner as discussed above for the Example Trim. The reactor is operated to steady state with a 90:10 HfP:EtInd co-supported catalyst. After the reactor was at steady state, a sample (Comparative $C_1$) was collected, and then the trim catalyst flow was started and the MIR response was observed while reactor conditions were adjusted to maintain product properties. A series of reactor conditions were run while varying trim solution flow rates to adjust MIR (Comparatives C2-C5). The trim catalyst was added so as to decrease the ratio of HfP:EtInd and increase MIR, and a sample was collected (Comparative C3). The total of time of trim solution and catalyst slurry in the feed lines between initial contact and the introduction of the $iC_5$ carrier is typically in the range of 15 to 60 minutes, with the ability to vary residence time as desired. Table 2 shows operating conditions and product properties for the Comparative Trim.

TABLE 2

Reactor Conditions and Product Properties

| | Example Trim | | | Comparative Trim | | | | |
|---|---|---|---|---|---|---|---|---|
| Sample | A1 | A2 | A3 | C1 | C2 | C3 | C4 | C5 |
| $H_2$ conc. (ppm) | 227 | 348 | 350 | 371 | 360 | 358 | 400 | 369 |
| Comonomer conc. (mol %) | 1.57 | 1.19 | 1.07 | 1.03 | 0.88 | 0.96 | 0.92 | 0.88 |
| Ethylene conc. (mol %) | 70.2 | 69.9 | 70.0 | 70.1 | 70.1 | 69.9 | 70.0 | 70.2 |
| Reactor pressure | 300 | 300 | 300 | 300 | 300 | 300 | 300 | 299 |
| Reactor temperature (° F.) | 185 | 185 | 185 | 185 | 185 | 185 | 185 | 185 |
| Catalyst slurry feed rate (cc/hr) | 35.0 | 37.5 | 32.5 | 23.3 | 26.0 | 25.1 | 25.1 | 15.0 |
| Trim solution feed rate (g/hr) | 0 | 53.28 | 44.35 | 0 | 37.4 | 48.7 | 18.73 | 0 |
| Melt Index, MI (dg/min) | 0.96 | 0.96 | 0.96 | 0.90 | 0.91 | 0.96 | 0.88 | 0.98 |
| High Load Melt Index, HLMI (dg/min) | 68.31 | 54.78 | 33.99 | 19.97 | 32.81 | 42.84 | 26.25 | 22.20 |
| Melt Index Ratio, MIR | 71.45 | 57.18 | 35.33 | 22.29 | 36.05 | 44.72 | 29.80 | 22.65 |
| Gradient density (g/cm$^3$) | 0.9183 | 0.9222 | 0.9194 | 0.9194 | 0.9216 | 0.9223 | 0.9181 | 0.9193 |
| Bulk density (g/cm$^3$) | 0.4378 | 0.4555 | 0.4309 | 0.4608 | 0.4605 | 0.4603 | 0.4725 | 0.4638 |

Table 2 shows the correlation between various product properties (such as melt index ratio (MIR; $I_{21}/I_2$) and density) and process conditions. The reactor temperature, and the weight or mol ratio of the two catalysts (or the catalyst trim ratio) may be an adjustment or control knob for the polyethylene MIR. Other adjustment and control points are considered. Moreover, a range of MIR values of the polymer can be considered for a given catalyst system used to produce the polymer. Other polymer properties such as density and MI may be calibrated. Furthermore, the techniques for reactor control described herein including the determinants considered in Table 2 may apply to (1) polyethylene product development, (2) direct control of the reactor during the actual production of the polyethylene, (3) targeted formulations development for reactor conditions for (a) various catalyst systems, (b) amounts of catalyst systems, (c) polyethylene grades or products, and so forth.

One important result is the correlation between melt index ratio ($I_{21}/I_2$) and catalyst ratio in co-supported HfP:EtInd. An increase in the HfP caused a decrease in MIR from about 71.45 to about 57.18. Thus, effective trim of HfP reduces MIR. Moreover, adding Catalyst III as the trim catalyst caused a further, and significant, decrease in MIR to 35.33. The table shows that the MI, gradient density, and bulk density can remain relatively the same throughout the process by adjusting other parameters such as hydrogen concentration and comonomer concentration.

Cross-fractionation chromatograms were obtained for (1) a polyethylene produced from HfP:EtInd (60:40), (2) a polyethylene produced from HfP:EtInd (60:40), followed by addition of HfP trim, and (3) a polyethylene produced from HfP:EtInd (60:40), followed by HfP trim, and then swapping to Catalyst III trim.

Cross-fractionation chromatography (CFC) analyses showed that instead of moving the location of the composition distribution and maintaining the same general shape, the introduction of Catalyst III as trim changed the shape of the combined molecular weight and comonomer distributions by the introduction of an additional major component. This illustrates that that the trim can be adjusted to control Mz and PDI.

The results indicate that MIR and HLMI are a function of at least the starting catalyst ratio (e.g., for the Example Trim: HfP:EtInd, 60:40), which catalyst is trimmed (e.g., for the Example Trim: HfP, and Catalyst III), and that certain catalysts can significantly impact the MIR due to incorporation of an additional major component. As can be seen from the results, the shift in MIR is predominantly due to HLMI. The results show an efficient system for mixed catalysts to obtain a desired MIR range by trimming HfP in an $iC_6$, $iC_5$, other hydrocarbon liquid, or mineral oil solution. The on-line ratio adjustment of co-supported catalysts via contacting with additional unactivated catalyst in utilizing trim technology and subsequent olefin polymerization allows adjustment of polymer properties without requiring preparation of different co-supported catalyst ratios. Additionally, adjustments may be made to the amount of hydrogen to maintain polymer MI (e.g., by adjusting the hydrogen/ethylene (H2/C2) ratio in the polymerization mixture in the reactor); and to the amount of comonomer to maintain polymer density (e.g., by adjusting the comonomer/ethylene ratio in a feed stream to the reactor and/or in the polymerization mixture in the reactor).

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I'" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present disclosure. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure.

While the present disclosure has been described with respect to a number of embodiments and examples, those skilled in the art, having benefit of the present disclosure, will appreciate that other embodiments can be devised which do not depart from the scope and spirit of the present disclosure as described herein.

We claim:

1. A method for producing a polyolefin comprising:
   maintaining the first composition at a temperature of 30° C. to 75° C. and a pressure greater than or equal to 25 psig in a first vessel;
   maintaining the second composition at a temperature of 30° C. to 75° C. in a second vessel;
   withdrawing a portion of the first composition and a portion of the second composition;
   contacting a first composition and a second composition in a line to form a third composition, wherein:
   the first composition comprises a contact product of a first metallocene catalyst, a second metallocene catalyst, a support, a first activator, a paraffin wax, and a first mineral oil, wherein a mol ratio of the second metallocene catalyst to the first metallocene catalyst is from 60:40 to 40:60 and the first composition comprises 40 wt % or greater of the paraffin wax based on the weight of the slurry,
   the second composition comprises a contact product of a third metallocene catalyst, a second activator, a second mineral oil, and the first metallocene catalyst or the second metallocene catalyst,
   wherein the second activator can be the same as or different from the first activator, the second mineral oil can be the same as or different from the first mineral oil, and the second mineral oil has a viscosity greater than the viscosity of isohexane, and the third composition comprises a mol ratio of the third metallocene catalyst to the second metallocene catalyst to the first metallocene catalyst of from 10:35:55 to 60:15:25;

introducing the third composition from the line into a gas-phase fluidized bed reactor;

contacting ethylene and $C_3$ to $C_{20}$ comonomer with the third composition in a single reaction zone under polymerization conditions; and obtaining a polyolefin.

2. The method of claim 1, wherein a mol ratio of the second metallocene catalyst to the first metallocene catalyst is selected to produce the polyolefin having:
a melt index ratio (MIR, defined as the ratio of $I_{21}$ (determined per ASTM D1238 at 190° C., 21.6 kg load) to $I_2$ (determined per ASTM D1238 at 190° C., 2.16 kg load)) of from 10 to 80; and
a density of from 0.913 g/cm³ to 0.940 g/cm³.

3. The method of claim 1, wherein a mol ratio of the second metallocene catalyst to the first metallocene catalyst is selected to produce the polyolefin having a high load melt index (HLMI, determined per ASTM D1238 at 190° C., 21.6 kg load) of from 30 to 80 g/10 min.

4. The method of claim 1, wherein a mol ratio of the third metallocene catalyst to the first metallocene catalyst is selected to produce the polyolefin having:
an MIR of from 10 to 80; and
a density of from 0.913 g/cm³ to 0.940 g/cm³.

5. The method of claim 1, wherein a mol ratio of the third metallocene catalyst to the first metallocene catalyst is selected to produce the polyolefin having an HLMI of from 30 g/10 min to 80 g/10 min.

6. The method of claim 1, wherein the polyolefin comprises a copolymer of ethylene and a $C_4$ to $C_{12}$ alpha olefin comonomer.

7. The method of claim 1, wherein the first metallocene catalyst promotes polymerization of ethylene into a low molecular weight portion of the polyolefin, and wherein the second metallocene catalyst promotes polymerization of ethylene into a high molecular weight portion of the polyolefin.

8. The method of claim 1, wherein the third metallocene catalyst promotes polymerization of ethylene into a high molecular weight portion of the polyolefin.

9. The method of claim 1, wherein the first metallocene catalyst is di(1-ethylindenyl) zirconium dimethyl.

10. The method of claim 9, wherein the second metallocene catalyst is bis(n-propylcyclopentadienyl) hafnium (IV) dimethyl and/or the third metallocene catalyst is dimethylsilyl-bis(trimethylsilylmethylenecyclolpentadienyl)hafnium dimethyl.

11. The method of claim 1, wherein each of the first mineral oil and the second mineral oil each have a density of from 0.85 g/cm³ to 0.9 g/cm³ at 25° C. according to ASTM D4052, a kinematic viscosity at 25° C. of from 150 cSt to 200 cSt according to ASTM D341, and an average molecular weight of from 400 g/mol to 600 g/mol according to ASTM D2502.

12. The method of claim 1, wherein the second composition is free of a support.

13. A method for producing a polyolefin comprising:
maintaining the first composition at a temperature of 30° C. to 75° C. and a pressure greater than or equal to 25 psig in a first vessel;
maintaining the second composition at a temperature of 30° C. to 75° C. in a second vessel;
withdrawing a portion of the first composition and a portion of the second composition;
contacting a first composition and a second composition in a line to form a third composition, wherein:
the first composition comprises a contact product of a first metallocene catalyst, a second metallocene catalyst, a support, a first activator, a paraffin wax, and a first mineral oil, wherein a mol ratio of the second metallocene catalyst to the first metallocene catalyst is from 60:40 to 40:60 and the first composition comprises 40 wt % or greater of the paraffin wax based on the weight of the slurry,
the second composition comprises a contact product of a third metallocene catalyst, a second activator, a second mineral oil, and the first metallocene catalyst or the second metallocene catalyst,
wherein the second activator can be the same as or different from the first activator, the second mineral oil can be the same as or different from the first mineral oil, and the second mineral oil has a viscosity greater than the viscosity of isohexane, and
the third composition comprises a mol ratio of the second metallocene catalyst to the first metallocene catalyst of from 60:40 to 90:10;
introducing the third composition from the line into a gas-phase fluidized bed reactor;
contacting ethylene and $C_3$ to $C_{20}$ comonomer with the third composition in a single reaction zone under polymerization conditions; and
contacting the third composition and a fourth composition in the line to form a fifth composition, wherein:
the fourth composition comprises a contact product of the third metallocene catalyst, a third activator, and a third diluent, and
the fifth composition comprises a mol ratio of the third metallocene catalyst to the first metallocene catalyst of from 2:1 to 1:10;
introducing the fifth composition from the line into the gas-phase fluidized bed reactor;
contacting ethylene and $C_3$ to $C_{20}$ comonomer with the fifth composition in a single reaction zone under polymerization conditions; and obtaining a polyolefin.

14. The method of claim 1, wherein the paraffin wax has:
a density (at 100° C.) of 0.75 g/cm³ to 0.87 g/cm³;
a boiling point of 200° C. or greater; and
a melting point of 35° C. to 80° C.

15. The method of claim 13, wherein the paraffin wax has:
a density (at 100° C.) of 0.75 g/cm³ to 0.87 g/cm³;
a boiling point of 200° C. or greater; and
a melting point of 35° C. to 80° C.

16. The method of claim 13, wherein the first metallocene catalyst promotes polymerization of ethylene into a low molecular weight portion of the polyolefin, and wherein the second metallocene catalyst promotes polymerization of ethylene into a high molecular weight portion of the polyolefin.

17. The method of claim 13, wherein the third metallocene catalyst promotes polymerization of ethylene into a high molecular weight portion of the polyolefin.

* * * * *